015# United States Patent [19]

Crane et al.

[11] 4,156,911
[45] May 29, 1979

[54] DYNAMIC RE-CREATION OF SIGNATURES

[75] Inventors: Hewitt D. Crane, Portola Valley; Daniel E. Wolf, Menlo Park, both of Calif.

[73] Assignee: Stanford Research Institute, Menlo Park, Calif.

[21] Appl. No.: 633,032

[22] Filed: Nov. 18, 1975

[51] Int. Cl.² .......................... G06K 5/00; G06K 9/00
[52] U.S. Cl. ...................... 364/419; 178/18; 235/431; 340/149 R; 340/146.3 SY; 364/513
[58] Field of Search .............. 444/1; 340/146.3 SY, 340/149 R, 149 A; 178/18–20; 235/61.7 R, 61.7 B; 364/400, 419

[56] References Cited

U.S. PATENT DOCUMENTS

| | | | |
|---|---|---|---|
| 3,579,186 | 5/1971 | Johnson | 340/146.3 SY |
| 3,618,019 | 11/1971 | Nemirousky | 340/149 R X |
| 3,699,517 | 10/1972 | Dyche | 340/146.3 SY X |
| 3,806,704 | 4/1974 | Shinal | 340/146.3 SY X |
| 3,818,443 | 6/1974 | Radcliffe, Jr. | 340/146.3 SY |
| 3,906,444 | 9/1975 | Crane et al. | 340/146.3 SY |

Primary Examiner—Joseph F. Ruggiero
Attorney, Agent, or Firm—Freilich, Hornbaker, Wasserman, Rosen & Fernandez

[57] ABSTRACT

In order to verify the authenticity of the signature of an individual, first a sample signature is written with a pen which can generate electrical signals representative of the forces exerted in the plane of the paper in the process of writing. These signals are sampled and then scaled so that the signature when displayed, can be fitted within a predetermined display area. The scaled signals generated from the sample signature are then stored. When it is desired to compare the sample signature with a signature which is subsequently written, called a specimen signature, the specimen signature is written and is processed for display in the same manner as was the sample signature. The scaled sample signature signals are then called out of storage and displayed, as are the scaled signals generated in the course of writing the specimen signature. Any deviations between the signatures are very readily detectable by observing the display.

25 Claims, 13 Drawing Figures

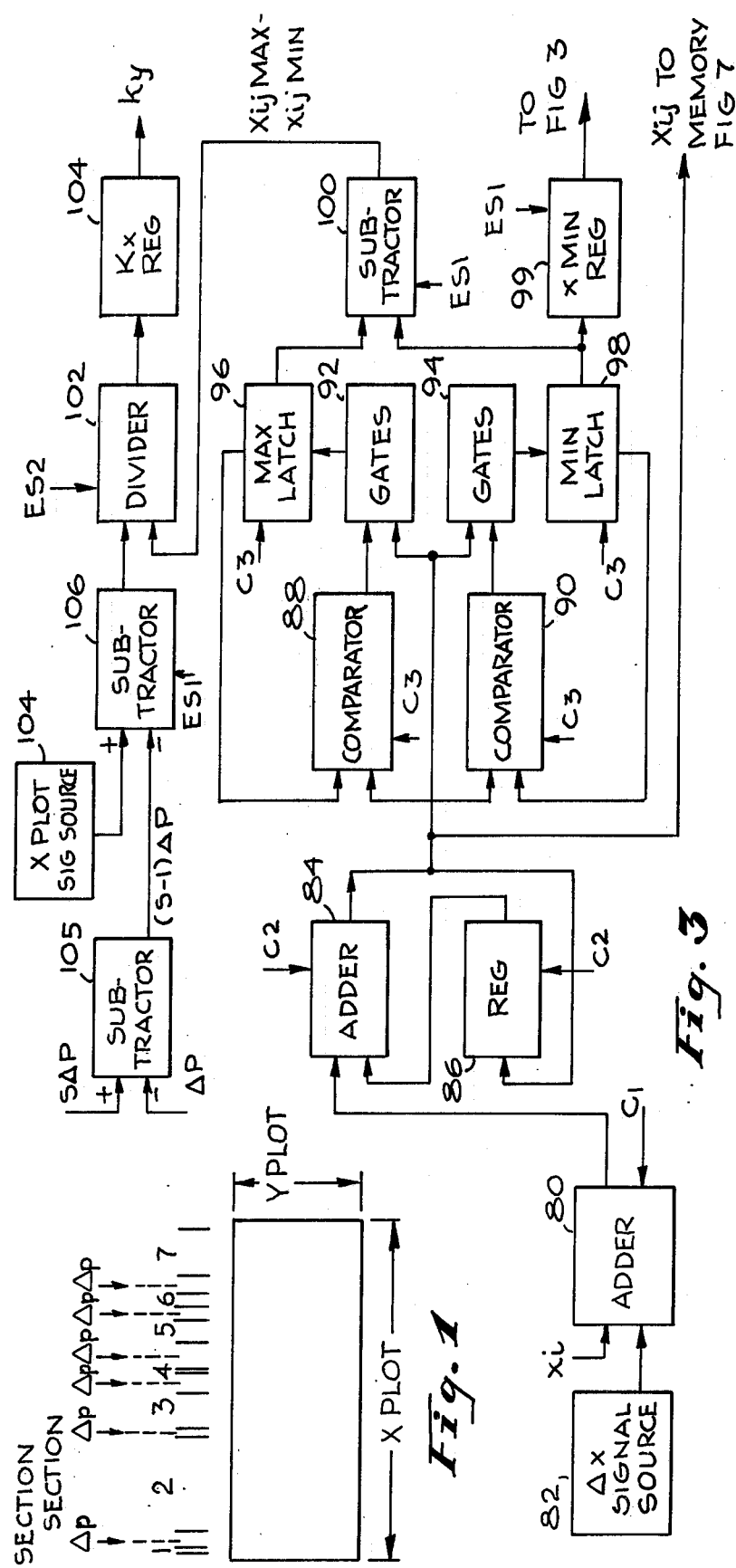
*Fig. 1*
*Fig. 3*
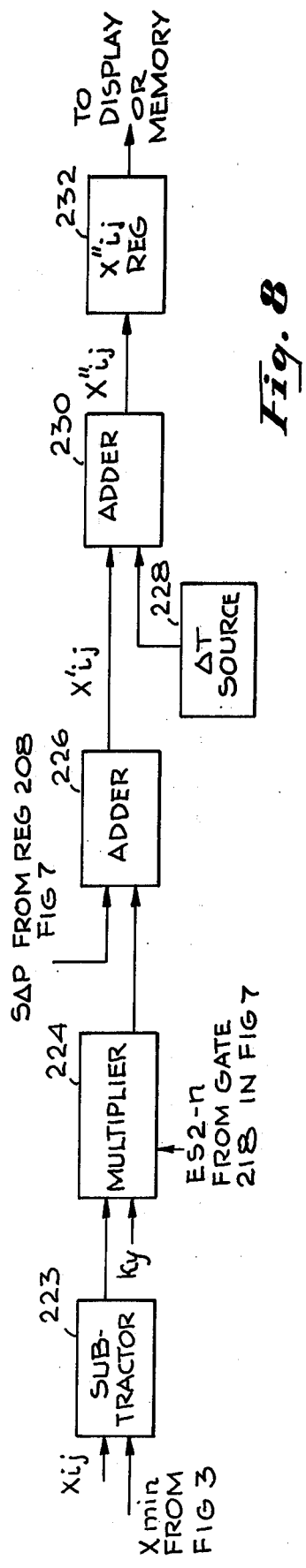
*Fig. 8*

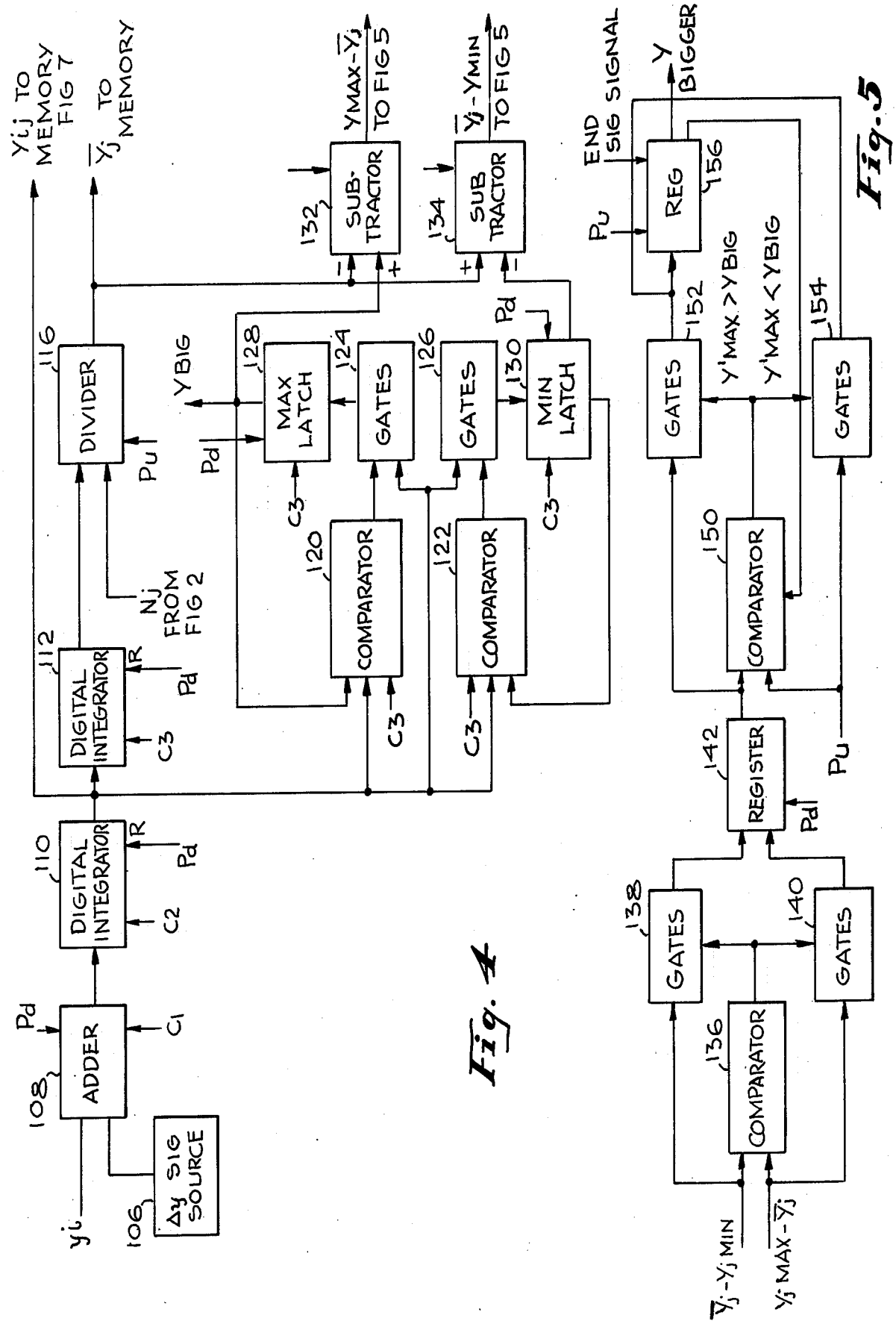

DYNAMIC RE-CREATION OF SIGNATURES

BACKGROUND OF THE INVENTION

This invention relates to a method and means of signature vertification and more particularly to improvements therein.

There has been a considerable amount of activity in the field of signature verification. For the most part, such activity has been directed towards automatic techniques of measuring parameters such as the forces produced in moving a pen while writing, the pressures exerted while writing, or the zero crossing for maximum and minimum points, and recording these, as they are generated in the course of writing a sample signature. These same parameters are then derived from a specimen signature and a machine comparison is made to determine, from their similarity, whether or not the specimen signature is a valid one or not.

While such systems are more or less effective, a visual comparison of two signatures for the purpose of determining autheniticity, is also an excellent way to perform this procedure since a human observer can take cognizance of a wide range of subtleties and special features of writing that it is difficult to program a machine to take into account. If some way could be found to process signals derived from a pen as it is being used to write a signature, which can be then displayed and compared with signals similarly processed from a previous sample signature, and if the processing technique is such as to take into consideration elements of the dynamics of writing which on display can make signature differences more readily detectable, the combination of both the machine and subjective processing can produce a system which permits accurate and rapid subjective verification of signatures.

The utility of a system which enables accurate subjective determinations of signature differences should not be considered as confined to detecting forged signatures. It may also be used for studying or detecting the effects of medication on a person, and also the effects of disease, both muscular and neurological.

OBJECTS AND SUMMARY OF THE INVENTION

An object of this invention is to provide a signature verification system which enables a combination of machine and subjective processing.

Another object of the present invention is to provide a novel and useful signature verification system.

The foregoing and other objects of the invention may be achieved in an arrangement, wherein a sample signature is written with a pen which generates electrical signals representative of the forces downward on the paper and in the plane of the paper during the writing of the signature. Provision is made for determining the number of times the pen is lifted during the writing of the signature (pen ups), and the number of times the pen is applied to the paper during the course of the writing of the signature (pen downs). As the writing progresses, samples of the signals in the x direction and in the y direction and the pressure used in writing are continuously taken and digitized.

The digitized x and y coordinate signals are scaled to fit within a display area so that when the signature is created from these x and y signals it will fit within the confines of the display area. The scaled signals from the sample signature are stored. They are called out of storage when it is desired to compare the sample signature with a specimen signature. The specimen signature is written with the same type of pen as the sample signature and the signals generated thereby are processed in the same manner as the signals generated in the process of writing the sample signature were processed. Then the signals for both the specimen signature and the sample signature are simultaneously displayed on a CRT for example whereby a visual comparison may be made. If desired, the pressure signal samples may be used to modulate the brightness of the display to further heighten the distinctions, if any, between displayed signatures.

The novel features of the invention are set forth with particularity in the appended claims. The invention will best by understood from the following description when read in conjunction with the accompanying drawings.

BRIEF DESCRIPTION OF THE DRAWINGS

FIG. 1 illustrates a recreated signature, as it appears on a display device.

FIG. 3 is a block schematic diagram illustrating how force signals in a horizontal direction derived from a pen, are processed to provide horizontal coordinate signals and a horizontal scale factor.

FIG. 4 is a block schematic diagram illustrating the processing of force signals in a vertical direction, derived from a pen, for obtaining vertical coordinate signals and signals representing the maximum and minimum displacements as well as the average displacement for each of a plurality of sectors.

FIGS. 5 and 6 are block schematic diagrams of circuits used for deriving a vertical scale factor.

FIG. 8 shows a block schematic diagram of an arrangement for scaling the x direction signals, which are read from the memory, to produce resultant X coordinate signals which can be displayed.

DESCRIPTION OF THE PREFERRED EMBODIMENTS

Figure 2:
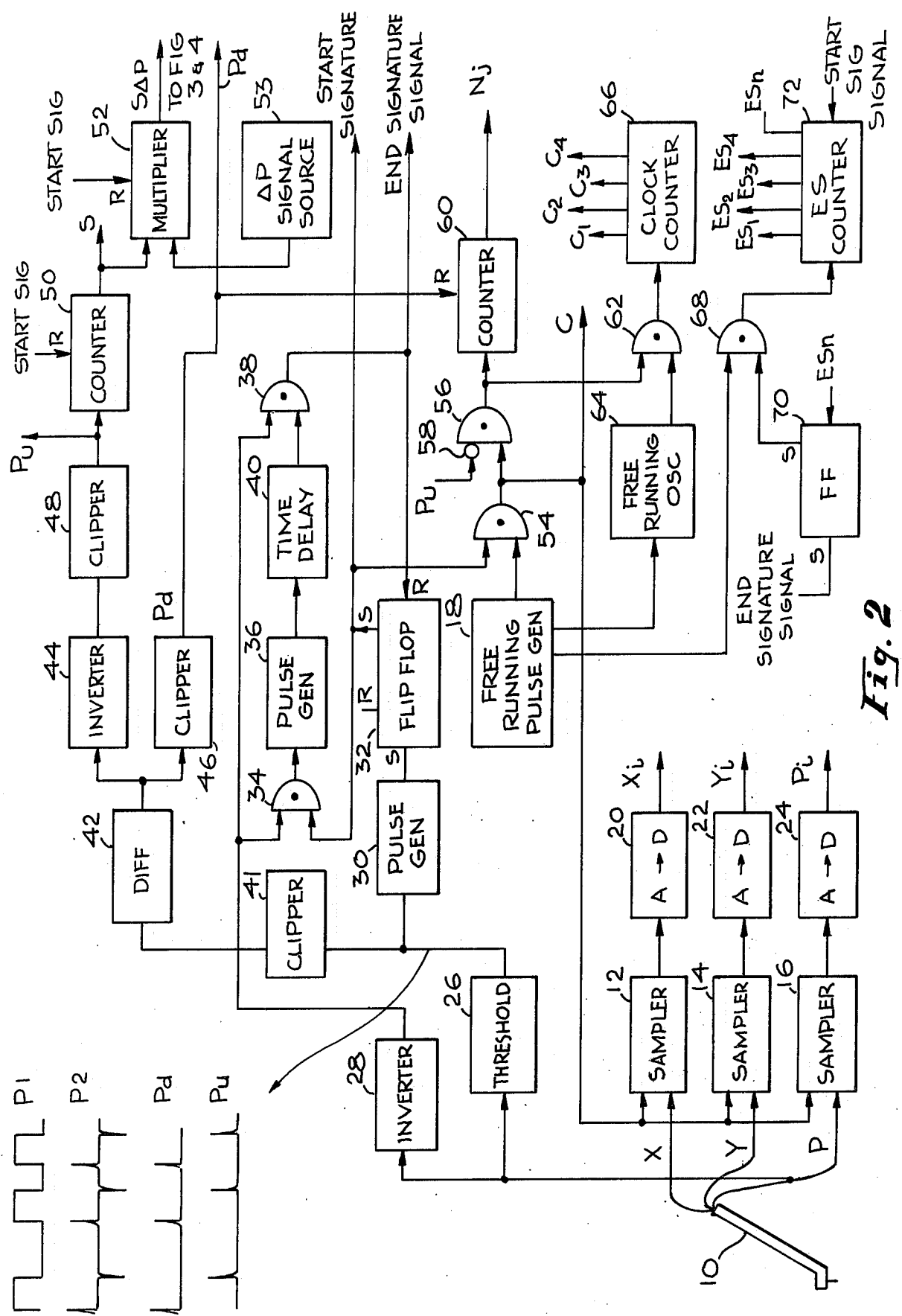
FIG. 2 is a block schematic diagram of the input circuits required for generating signals from a pen as it is being used for writing.

The word signature, as used in both the specification and the claims herein is not to be construed solely as meaning the name of a person. Any sequence of characters or words or symbols may be processed by this invention and are intended to be within the meaning of the word signature.

FIG. 1 is a representation of a signature display, in accordance with this invention. Since the display will occupy a pre-determined area, the horizontal dimension of the area is designated as Xplot and the vertical dimension of the area is designated as Yplot. Each time a signer lifts his pen, in writing his signature, a space is alloted between the pen lift and the next pen down location, which space is designated as ΔP. The region over which writing occurs without a pen lift is designated as a sector.

Thus, the signator here first used a down stroke for the front side of the H, which is designated as sector one. He then lifted his pen. Following the pen lift a space ΔP is allocated. Thereafter, the rest of the first name was written in the space which is designated as sector 2. The pen was then lifted to cross the t's. This caused the establishment of another space designated as ΔP. The dash like stroke of sector 3 results from the crossing of the t's. Thereafter, upon pen lift another ΔP space is allocated. A dot over the "i" is written. This is designated as sector 4 and is followed by another space ΔP. Thereafter the initial D is written in the space denoted as sector 5. This is followed by another ΔP space. The dot following the D occurs in sector 6. This is followed by another space ΔP. This is followed by the last name Crane, which forms sector 7. In summary, each time the pen is lifted a ΔP spacing is allocated before the next part of the signature is displayed. The ΔP spacing is followed by a sector whose horizontal length is determined by the distance between the maximum and minimum horizontal display locations derived from the pen signals between a single pen down and pen up operation. Accordingly, in the horizontal direction, the problem presented is that, in view of the limited Xplot space allowed, the spacing allocated to all of the ΔP's must be subtracted from Xplot, and then the remainder of the signature must be fitted into the remaining space.

In the vertical or Y direction, the signals within each sector are positioned so that the average Y value for the sector equals zero. That is the Y average for each sector is calculated and then subtracted from each Y value within the sector. In effect this makes all of the various sectors straddle the mid line. In addition, the maximum and minimum Y value for all sectors is found and all of the Y values are then scaled so that the maximum Y value just fits within the bounds of the display area.

Referring now to FIG. 2, a pen 10, such as is described and claimed in U.S. Pat. No. 3,915,015, is used by way of example, for generating force signals, such as x and y signals which are respectively generated as the pen is moved in the x and in the y direction, and P signals which are pressure signals generated when the pen is pressed down against the paper for writing. Each one of the respective X, Y and P signals is applied to respective sampling circuits, 12, 14, and 16, which sample these signals at intervals determined by the output of a free-running pulse generator 18. The samples, derived by the sampler circuits 12, 14 and 16, are applied to respective A to D converters, 20, 22, 24, for the purpose of being digitized.

The x and y signals, which are sampled are proportional to the force in these respective directions in a coordinate system fixed to the pen. On the assumption that the instantaneous x and y values are proportional to the instantaneous x and y velocities in the plane of the paper, (i.e. due to pure drag of the pen on paper) then by integrating these instantaneous x and y velocities one can obtain X and Y coordinate values from which the signature may be recreated.

The x and y forces generated by the pen are not exactly proportional to the instantaneous pen velocity but close enough that by integrating the force signals as described above, coordinate signals X and Y are generated which when plotted provide a useful facsimile of the original signature. The re-created signature generally looks like a distorted version of the familiar static signature. It is the distortions in fact that carry the interesting dynamic information.

In the remainder of this disclosure, capital X and Y symbols will represent integrals of the basic force signals, x and y, derived directly from the pen. More specifically, $X_{ij}$ and $Y_{ij}$ will represent respectively the horizontal and vertical i(th) coordinate of the j(th) sector of the re-created signature.

When the pen is pressed down on a surface for writing, the P signal generated is indicative of that situation.

This signal is applied to a threshold circuit 26, and to an inverter circuit 28. If the P signal exceeds the level of a bias voltage provided by the threshold circuit 26, indicative of the fact that the pen is actually being used for writing, a pulse generator 30, is actuated to provide a pulse, which sets a flip flop 32. The set state output of the flip flop circuit is a "start signature signal," indicative of the fact that a signature has been started. The set state output of the flip flop 32 is also applied to an And gate 34, to act as an enabling input. The other input to the And gate 34 is the output of the inverter 28. In the presence of the P signal, no output is applied by the inverter 28 to the And gate 34. In the absence of the P signal, an input is applied by the inverter to the And gate 34. And gate 34 output actuates a pulse generator 36. The inverter output is also used to enable another And gate 38. The output of the pulse generator 36 is applied to a time delay circuit 40. After an interval, determined by the time delay circuit 40, if the pen 10 is still up so that the inverter output is still present, the And gate 38 applies its output to reset flip flop 32.

The purpose of the circuit just described is to distinguish between pen ups which occur in the usual writing of the signature, either between names or for the purpose of crossing t's or dotting i's, and those pen-ups which occur when a person has completed the signature. The time delay 40 is set for an interval sufficient to allow for crossing t's, dotting i's or other activities during the course of writing a signature wherein the pen is lifted from the paper. However, if the signature is ended, the time delay interval is exceeded and the flip-flop 32 is reset. The output of the And gate 38 which resets flip flop 32 also serves as an "end-signature signal."

It was previously stated that when the pen is down during the course of writing, an output is received from the threshold circuit 26. This output, besides being applied to the pulse generator 30, is also applied to a clipper circuit 41 and a differentiator circuit 42. The P signals generated by the pen 10, which appear at the output of the clipper circuit 41 comprise a wavetrain such as P1 wherein each time the pen is applied to the paper a pulse is generated having a duration for as long as the pen is maintained applied to the paper, and each time the pen is lifted from the paper a no pulse interval occurs until the next pen down activity. This pulse wavetrain is differentiated by the differentiator 42 providing a wavetrain such as P2, having positive going signals corresponding to the positive leading edges of the P1 pulses signifying pen down actions, and negative going actions corresponding to the trailing edges of the P1 pulses, which occur when the pen is lifted. The output of the differentiator is applied to an inverter circuit 44 and to a clipper circuit 46. The clipper circuit eliminates the negative going signals in the output of the differentiator and therefore the clipper circuit output comprises a train of signals each of one of which is indicative of a pen down operation. These are identified as Pd signals. The clipper 48 following the inverter 44 provides an output only in the presence of positive going signals from inverter 44, (and therefore negative going signals from differentiator 42) and does not pass negative going signals. The output pulses passed by clipper 48 are applied to a counter 50. Since the pulses passed by clipper 48 occur only at pen up times then the output of the clipper 48 will be the pen up signals (Pu). Counter 50 counts the number of pen up signals that occur during the course of a signature. Counter 50 is reset in the presence of a Start-Signature signal output from flip flop 32.

Since, as previously indicated, the number of sectors,s, which occur during the course of writing a signature is measured by the number of pen ups, the count output,s, of the counter 50 indicates the number of sectors in the signature. Each count output of the counter is multiplied by $\Delta P$, supplied to multiplier 52, from a $\Delta P$ signal source 53. The multiplier output, $S\Delta P$ provides an indication of the amount of $\Delta P$ space that must be allocated at any given time for the amount of signature completed at that time. The final output indicates the total amount of space required for all of the spaces between sectors.

The start signature signal enables an And gate 54, which has as its second input the output of the free-running pulse generator 18. This it will be recalled, provides the sampling timing signals. When the And gate 54 is enabled by the start signature signal output of flip flop 32, pulses from the free-running pulse generator 18 are applied to a second And gate 56 and also to the sampling circuits 12, 14 and 16. And gate 56 is enabled in the absence of a pen up signal. This is achieved by Pu being applied through an inverter 58 to the And gate 56. Inverter output 58 activates And gate 56 during the process of writing a signature while the pen is being applied to the paper.

Accordingly, when the pen is first applied to the paper to write a signature, pulses from the free-running pulse generator 18 are applied through the And gates 54 and 56 to a counter 60. At the end of the first sector, a pen up signal appears and counter 60 at that time will indicate a count, designated as Nj, indicative of the samples which were taken over the j(th) sector. Upon the occurrence of a Pd signal, when the pen is next applied to the paper to continue writing, the counter is reset and will then commence to count again the number of samples which occur over the next writing sector.

The output of the And gate 56 is also applied to an And gate 62, to constitute one enabling input. A free-running oscilllator 64, applies pulses to the And gate 62 at a frequency which is at least 4 times greater than the frequency of the free-running pulse generator 18 and is synchronized therewith. The output of the And gate 62 is used to drive a clock counter 66. The outputs of the clock counter 66 are designated as C1 through C4.

The output of the free-running oscillator 18 is applied to another And gate 68. This And gate is only enabled in the presence of the set output of a flip-flop 70. This flip-flop is set in response to an end signature signal. The output of the And gate 68 is applied to a "ES" counter 72. This counter counts for as many counts as the maximum number of signature samples to be taken (n). It provides an output for each count ES1 through ESN. The last count ESN, is used to reset flip-flop 70. When this occurs And gate 68 is disabled and no more pulses are applied through it to the counter.

It should be noted that the digital values which are derived from the A to D converters 20 and 22 may be negative as well as positive. A negative $X_i$ occurs when the writer moves the pen to the left. Negative $Y_i$ values occur when the pen is moved vertically downward as opposed to vertically upward.

FIG. 3 is a block schematic diagram of the circuits used for deriving an unscaled set of X coordinate values together with a scale factor Kx. The sample xi signals derived from A to D converter 20, are added in an adder 80 together with signals from a $\Delta X$ signal source 82. $\Delta X$ represents a factor that can adjust the effects of leftward and rightward writing. Without such compensation, if the pen is rolled to the right, for example, the instantaneous xi values are larger than with the pen vertical. Thus, closed loop segments such as e's and l's would tend to become thinner. In fact, with enough roll to the right, the minus x1 component generated during the leftward writing segments would be smaller in magnitude than the plus xi contribution due to the roll itself and therefore the xi signals would never become negative. In such a case there would be no closed loops at all in a resulting signature plot. Conversely, if the pen has a leftward roll, closed loops are exaggerated.

Compensating effects can be achieved if desired by adding a fixed positive or negative value $\Delta X$ to each value of xi. If $\Delta X$ is positive, loops are deemphasized. If $\Delta X$ is negative, loops are exaggerated. The same effects can be achieved in the vertical direction if a fixed $\Delta Y$ is added to each yi sample. A positive value of $\Delta Y$ causes each recreated segment of the signature to slope upward. A negative value of $\Delta Y$ causes each segment to slope downward. $\Delta X$ and $\Delta Y$ are empirically determined by observing what values are required to obtain the best results.

The adder 80 is enabled to add its inputs upon the application of a C1 pulse from the clock counter. The output of the adder 80 is applied to an adder 84. The output of the adder 84 is applied to a register 86. The output of the register 86 is applied to the adder 84 to be added to the output of the adder 80. Adder 84 and register 86 are instructed to add on the C2 count of the counter 66.

Figure 7:
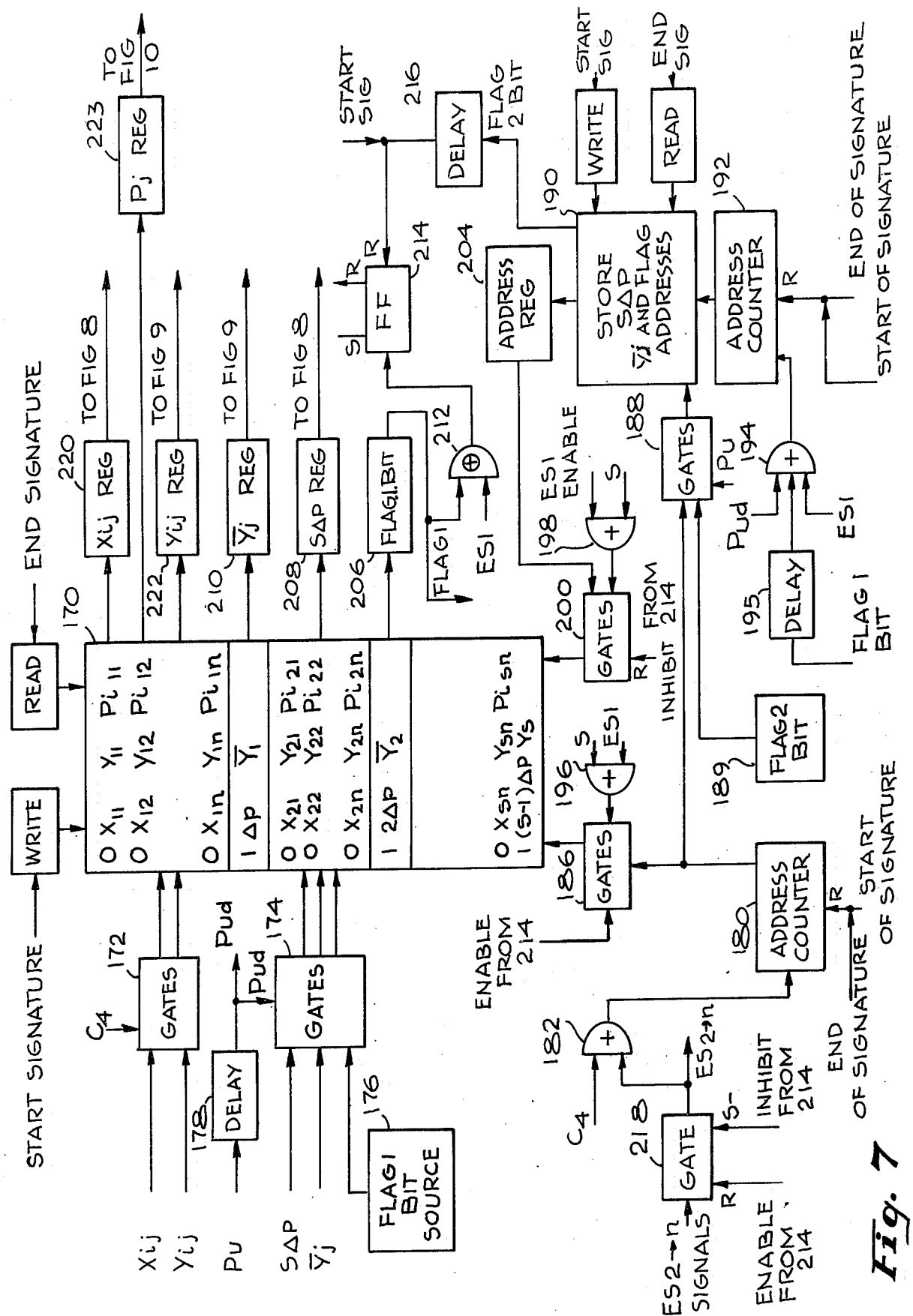
FIG. 7 is a block schematic diagram of a storage arrangement for the signals generated by the circuits shown in FIGS. 2, 3 and 4.

Effectively, adder 84 and register 86 constitute a digital integrator, the adder 84 adds the latest sample (xi+$\Delta X$) to the previous sum which the register 86 accumulated. Each output of the adder 84 constitutes a coordinate which is desgnated as Xij, i.e., the ith X coordinate of sector j. The Xij output, as shown in FIG. 7 is stored in the memory for further processing.

The Xij output of the adder 84 output is applied to two comparators respectively 88, 90, and also to two respective sets of gates, 92, 94. A second input to comparator 88 is the output of a register, designated as max latch 96. A second input to the comparator 90 is designated as min latch 98. Gates 92 are enabled to transfer the output of the adder 84 into max latch when comparator 88 indicates that the adder 84 output are greater than the current contents in max latch 96. Gates 94 are enabled to transfer the contents of the adder 84 into the min latch 98 when the comparator 90 output indicates that the adder 84 contents are less than the current contents in the min latch 98. Initially max latch 96, is filled with all zeroes, and initially min latch 98, is filled with all ones.

Accordingly, by the time the signature has been completely written, max latch will contain the maximum $X_{ij}$ and min latch will contain the minimum $X_{ij}$.

The comparators and min and max latch registers are enabled to become operative in response to the C3 clock pulse.

At the conclusion of the signature, as shown in FIG. 2, the ES counter is enabled to start counting. Upon the occurrence of the ES1 output, min latch and max latch can supply their contents to a subtractor 100, which subtracts the contents of the min latch register from the max latch register to provide a difference. Also the min latch contents are dumped into a register 99 which supplies min latch to FIG. 8. The difference is applied to a divider circuit 102 to be divided by a number representing the difference between X total plot space and $(S-1)\Delta P$ space required. To obtain this, the value $(S-1)\Delta P$ is applied to a subtractor to be subtracted from a number representative of the length of the Xplot which is provided by an Xplot signal source 104. $(S-1)\Delta P$ is obtained by applying $S\Delta P$, the output of multiplier 52 and the value $\Delta P$ to a subtractor circuit 105. Its output is $(S-1)\Delta P$. The subtractor 106 is enabled in response to the ES1 signal output of the counter 72, and applies its output to the divider 102. In response to the ES2 signal from the ES counter, the divider 102 performs the necessary division and its output is stored in a register 104, designated as the Kx register.

FIG. 4 is a block schematic diagram illustrating an arrangement for deriving the Y coordinates as well as the average Y for each sector and the maximum and minimum Y's. The yi signals together with the $\Delta Y$ signal from a source 106, are applied to an adder 108. In response to a C1 pulse, the adder 108 adds its inputs and applies them to a digital integrator 110. Digital integrator 110 comprises circuits such as adder 84 and register 86, in FIG. 3, which operate to integrate the digital input. The digital integrator 110 is enabled to become operative in response to a C2 clockpulse. The output of the digital integrator comprises the coordinate $Y_{ij}$, i.e. the ith Y coordinate of sector j. Digital integrator 110 resets each time a pen down pulse Pd occurs, indicative of the beginning of the next sector. Accordingly, the output of the digital integrator 110, at the end of each sector, comprises a sum of all of the Y coordinates for that sector. The respective coordinate values $Y_{ij}$ are stored in a memory, as shown in FIG. 7, in association with the coordinate $X_{ij}$ values.

In order to determine the average $Y_{ij}$, designated as $\overline{Y}_j$ for each sector j, the outputs of the digital integrator 110 are summed by a following digital integrator 112. This integrator adds the successive $Y_{ij}$ coordinates and applies the sum to a divider 116, which at Pu time is enabled to divide this number by Nj, which is the count at Pu time in counter 60, shown in FIG. 2. This count represents the number of samples which were taken during the jth sector just ended. The digital integrator 112 is reset at Pd time. The output of the divider 116, as indicated, represents the value of $\overline{Y}_j$, which is the average Y value for the particular sector. The $\overline{Y}_j$ value for each sector is stored in memory, as shown in FIG. 7.

The determination of a maximum $Y_{ij}$ and minimum $Y_{ij}$ employs the same structure as was used for determining the maximum $X_{ij}$ and minimum $X_{ij}$. The digital integrator 110 output is applied to two comparators respectively 120, 122 and also to two sets of gates, respectively 124, 126. The output of the gates are applied to a max latch register 128, and the output of the gates 126 are applied to a min latch register 130. Comparator 120, upon the occurrence of a C3 clock pulse, compares the output of the adder 110 with the output of the max latch 128. If the adder output is greater than the max latch output then gates 124 will transfer the contents of the adder into the max latch register replacing its contents. If the adder contents are less than the contents of the min latch register 130, the comparator 122 will produce an output which enables the gates 126 to transfer the contents of the adder 110 into the min latch register replacing its contents. The pen down signal resets max latch and min latch to their respective initial states, which in the case of max latch is an all zero state and in the case of min latch is a one state.

The $\overline{Y}_j$ value for the sector for which the min latch and max latch has just been calculated, is applied to two subtractors respectively 132 and 134. Subtractor 132 will subtract the average Y value $\overline{Y}$ from the max latch value upon the occurrence of a pen up signal Pu. Subtractor 134 will subtract the min latch value from the average Y value upon the occurrence of a pen up signal. The differences are applied to circuits shown in FIG. 5 for the purpose of determining a value designated as Y'max, which is used to obtain the largest Y coordinate value over all segments.

Referring now to FIG. 5, there is shown a block schematic diagram for determining Y'max and then retaining the one of the Y'max or the output of the max latch 128, designated as Y big, whichever is bigger.

The $\overline{Y}_j$ − Ymin output from the subtractor 132 are applied to a comparator gate 136, and to gates 138. The Ymax − $\overline{Y}_j$ output of subtractor 134 is applied to the comparator 136 and to gates 140. Gates 138 are enabled by the comparator output to enter $\overline{Y}_j$ − Ymin into a register 142 if $\overline{Y}_j$ − Ymin exceeds Ymax − $\overline{Y}_j$. If Ymax − $\overline{Y}_j$ exceeds $\overline{Y}_j$ − Ymin the comparator enables gates 140 to enter Ymax − $\overline{Y}_j$ into the register 142. Thus at the end of each sector register 142 will retain the larger of the two values applied to the comparator 136, which is designated as Y'max.

The Y'max signal for each sector at Pd time is entered into a comparator 150 and also applied to gates 152. Also applied to comparator 150 are the contents of a register 156. The contents of register 156, designated as Ybigger, are also applied to gates 154. At Pu time the comparator is enabled to compare its inputs, Y'max and Ybigger. The comparator output, if Y'max exceeds Ybigger will enable gates 152 to transfer the Y'max signals into the register 156. If the Ybigger signals exceed Y'max, gates 154 are enabled to transfer the Ybigger signals into the register 156. Therefore, at the end of the signature, register 156 will contain the Ybigger, for all sectors, which is the greatest Y signal which is generated in the course of the writing of the signature. Register 156 is cleared by an end signature signal.

Figure 6:
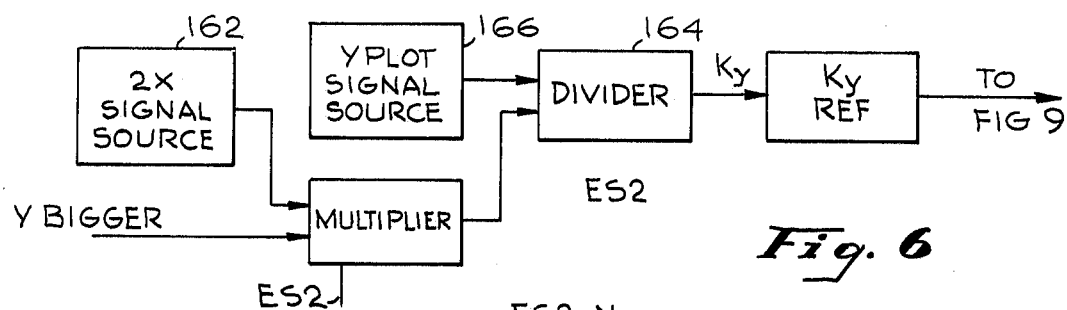

Referring to FIG. 6, there may be seen a block schematic diagram for computing the scale factor Ky. A multiplier 160, receives as an input the Ybigger output of the register 156. Upon the occurrence of an ES2 signal from the ES counter, the multiplier receives a signal from the "two times" signal source 162 instructing it to double its contents. As is well known, this is done by shifting the digits of a binary number one place to the left. The contents of the multiplier 160, at ES2 time, is applied to a divider 164, to be divided into the Yplot quantity, derived from the Yplot signal source 166. The resultant output of the divider 164 is Ky.

Referring now to FIG. 7, there may be seen a block schematic diagram which provides for the storage of the Xij and Yij coordinates together with the $\Delta P$ spacing and the $\overline{Y}j$ or average Y for a sector in a memory 170. The manner in which these quantities are stored in the memory is represented in the drawing. A zero or no flag bit is stored with each of the coordinates. The coordinates are stored in the sequence in which they are generated. The first sector storage commences with coordinates X11 and Y11, extending until the end of the sector as identified by a pen up signal, and the coordinates then are X1n1 and Y1n1. In the next location there is stored a flag bit designated as "1," the $\Delta P$ data, and the average Y for the sector represented by $\overline{Y}1$. Then there follows the coordinate information for the next sector represented by X21, Y21 down through X2n2 Y2n2. This is followed by the flag bit "one," $2\Delta P$, and $\overline{Y}2$. Pressure signals Pij may also be stored adjacent the Xij and Yij.

In this manner the data generated by the circuits represented in FIGS. 3 and 4, namely the Xij, Yij and $\overline{Y}j$ data together with the output of the multiplier 52 is stored in the memory. The write-in signal to the memory is supplied by the start signature signal. The Xij and Yij inputs are applied to gate 172, which are enabled in the presence of a C4 pulse. Gates 174 have as their inputs the output of the multiplier 52, namely $S\Delta P$, the $\overline{Y}$ input and a flag bit which is derived from a flat bit source 176. These gates are enabled in the presence of a delayed pen up pulse. This is obtained by applying the Pu signal to a delay circuit 178, whose output Pud is applied to the gates to enable the gates 174.

The address locations in which the inputs are stored is determined by an address counter 180. This counter receives signals which enable it to advance its count from an Or gate 182. One input to the Or gate comprises C4 signals. The address counter output is applied to a set of gates 186 which are enabled by the reset output of flip flop 214 during the write in of the coordinate information as well as the flagbit, $\Delta P$ and $\overline{Y}$ information. The address counter also applies its output to a second set of gates 188. These gates are enabled each time a pen up (Pu) pulse occurs to enable the write in of the address in the address counter 180, at that time, to a second memory, 190. The address in the address counter 180 at the time that a Pu pulse occurs is the address in which a flag one bit, $S\Delta P$ and the $\overline{Y}j$ data is stored. The address in the memory 190 in which this data is stored is provided by an address counter 192. This address counter is enabled to advance in response to an output of an Or gate 194. One input to this Or gate is a Pud pulse output from the delay circuit 178.

Accordingly, upon the occurrence of a Pu signal, the storage address of a flag bit $\Delta P$ and $\overline{Y}j$ is stored in a memory 190 at an address provided by an address counter 192. With each address, there is also stored a flag 2 bit from a flag 2 bit source 189. In this manner, the memory 170 will store the coordinate data, $S\Delta P$ and $\overline{Y}j$ data while the memory 190 will store the adresses of the $S\Delta P$ and $\overline{Y}j$ locations in the memory 170, and a flat 2 bit.

Upon the occurrence of the end signature signal, address counters 180 and 192 are reset and the memory 170 and the memory 190 are transferred from their write modes to their read modes. At this time, the ES counter 72 in FIG. 2 commences providing an output. The ES1 output of the ES counter is applied to an Or gate 196, the output of which disenables gates 186. The ES1 pulse is also applied to an Or gate 198, the output of which enables a set of gates 200.

The end signature signal transfers both the memories 170 and 190 into their read states. Accordingly, when the address counter 192 is transferred to its first address count state by the end signature signal, there is a read out from the memory 190, into an address register 204, of the address of the $S\Delta P$ and $\overline{Y}j$ data, together with the flag 2 bit. The address register 204 applies its output to the gates 200, which are now enabled, and accordingly, the memory 170 will read out the flag 1 bit, $\Delta P$ and $\overline{Y}j$ into the respective registers 206, 208 and 210, in which are respectively stored the flag 1 bit, $\Delta P$ and $\overline{Y}j$. The flag 1 bit is applied to an exclusive Or gate 212, whose output is applied to a flip flop 214. The ES1 count output is also applied to the exclusive Or gate 212. In the presence of ES1, and the flag 1 bit, exclusive Or gate 212 will have no effect on the flip flop 214. In the absence of the ES1 count pulse, the output of the exclusive Or gate 212 will set flip flop 214. The flag 1 bit is applied through a delay circuit 195 to the Or gate 194 to advance the address counter 192 to its next count state. The flag 2 bit which is read out of the memory 190, along with each address is applied through a delay circuit 216 to reset flip flop 214. When flip flop 214 is in its reset state, its reset output enables gates 186 and disenables gates 200. Further, termination of the ES1 pulse permits gates 186 to become enabled and gates 200 to become disenabled.

At that time, all further count outputs of the ES counter are applied to a gate 218, whose output is applied to the Or gate 182. It further should be noted that gate 218 is inhibited by the set output of flip flop 214, it is enabled by the reset output of flip flop 214. Accordingly, the ES2 count output is now applied to the address counter 180 setting it in its first count and first address state which is the location of the X11 and Y11 coordinates. Since the address gates 186 are now enabled the first sector coordinate information will be successively read into the respective Yij, Yij, and Pij registers 220, 222 and 223.

Address counter 180 will continue to be sequenced by the count outputs from the ES counter successively reading out the Xij and Yij data of the first sector into the respective registers 220 and 222. When the flag one bit, and the $\Delta P$ and $\overline{Y}1$ data, at the end of the first sector storage locations, is read out into the registers provided for them, the flag 1 bit is applied to set the flip flop 214 whereupon the gates 186 are inhibited and gates 200 are enabled. Address counter 192 provides the address of the next location in the memory 170 where $2\Delta P$ and $\overline{Y}2$ are stored together with the flag 1 bit. These are read out into the respective registers provided therefore and replace the digital information which has just previously been read out. When flip flop 214 it set, it disenables the gate 218 whereby the address counter 180 cannot advance but holds the location from which the last readout has occurred.

Shortly after the readout from the memory 170, the flag 2 bit resets flip flop 214 enabling address counter 180 to continue addressing the memory 170 through its now enabled gate 186.

In the manner described, the read out from the memory 170 will first provide the data which was written into the memory at the end of the sector, and will then provide, in sequence, the coordinate data from that sector. It will then proceed to replace the sector data with the data for the following sector, followed by the coordinate information for that sector. The memory 170 may be sequenced through its reading cycle in response to ES pulses while the memory 190 may be sequenced through its reading cycle, also in response to pulses from the ES counter. The ES counter is provided with a sufficient count capacity to take care of all of the recordations required for the sectors.

FIG. 8 is a block schematic diagram of the further processing of the Xij signal which has been read out into the register 220. The Xmin signal, which was stored in the min latch 98, in FIG. 3, is subtracted from each Xij coordinate read out of the memory 170 into register 220 by a subtractor circuit 223. A multiplier 224, then multiplies the difference by the Kx scaling factor that was calculated in FIG. 3 and held in register 104. Multiplier 224 is enabled to multiply in response to each ES output from the gate 218, shown in FIG. 7. The output of the multiplier 224 is applied to an adder 226, which adds to the scaled Xij the ΔP displacement in register 208, producing an output designated as $X_{ij}'$. If a displacement from the side of X plot is desired, then the digital representation of this displacement may be provided by a ΔT source 228, and added to an $X_{ij}'$ by an adder 230. The resultant, $X_{ij}''$ signal may be placed in a register 232 of transferred into a memory along with the finally processed $Y_{ij}$ signal, or may now be displayed on a display device, such as a CRT, along with finally processed $Y_{ij}''$ signals.

Figure 9:
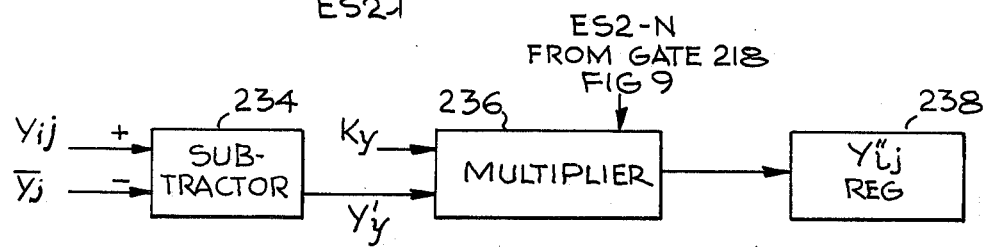
FIG. 9 shows a block schematic diagram of an arrangement for scaling the Y direction signals, which are read from the memory, to produce resultant Y coordinate signals which can be displayed.

FIG. 9 shows the further processing required for the $Y_{ij}$ signals. Each $Y_{ij}$ signal, which is read out of the memory 170 has subtracted from it the Yj signal which is the average value for the sector. Subtraction is provided by a subtraction circuit 234, to which the $Y_{ij}$ and Yj signals are applied. The output of the subtractor circuit, which is designated as $Y_{ij}'$, is applied to a multiplier 236. The other input to the multiplier is the Ky scaling factor, which was generated by the circuitry shown in FIG. 6. The multiplier is enabled by ES2-n signals from gate 218 in FIG. 7. The output of the multiplier 236 is designated as $Y_{ij}''$ and is the scaled coordinate which can be plotted along with the corresponding $X_{ij}'$, which was generated in the circuitry shown in FIG. 8.

Figure 10:
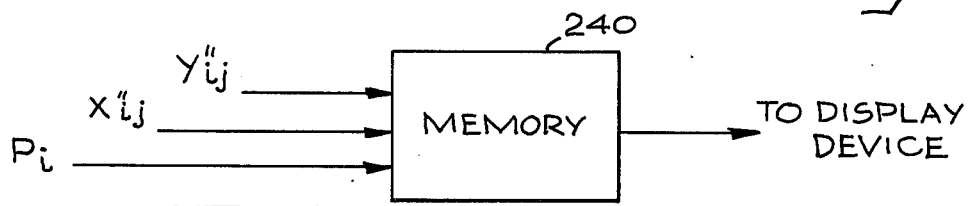
FIGS. 10 through 13 are block schematic diagrams illustrating how the system, in accordance with this invention, may be used for the purposes of study and/or verification of a signature.

As shown in FIG. 10, the $Y_{ij}''$ and $X_{ij}''$ may be sequentially stored in a memory 240, or may be displayed if desired on a cathode ray tube device. In the display mode, a point is illuminated on the face of a cathode ray tube, for instance at each $X_{ij}''$, $Y_{ij}''$ coordinate.

If desired, in order to render distinctions between successively written signatures, if they exist, the pressure samples shown being taken in FIG. 2, may be stored in the memory with each $X_{ij}$ and $Y_{ij}$ coordinate. The pressure sample Pi is read out of memory with each associated $X_{ij}$ and $Y_{ij}$ coordinate held in a register until the $X_{ij}$ and $Y_{ij}$ signals are processed into $X_{ij}''$ and $Y_{ij}''$ and then either stored, as represented in FIG. 10 with $X_{ij}''$ and $Y_{ij}''$ for future display, or used immediately to modulate the brightness of each $X_{ij}$ and $Y_{ij}$ coordinate shown on a CRT.

Storage of the indicated data for a plurality of signatures and the ability to recall the data from storage by properly addressing the storage, is a technique which is well-known by those skilled in the computer art and thus will not be described here.

Figure 11:
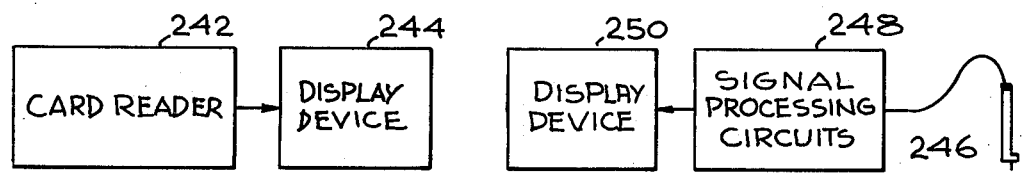

FIG. 11 illustrates one manner in which this system may be used. The $X_{ij}''$ and $Y_{ij}''$ signals derived from a signature are recorded in a card, either in the form of magnetic signals on a magnetic stripe, or as embossed symbols. The card may be inserted in a card reader 242, which scans the recorded coordinate information and applies these signals to a suitable display device 244, such as a cathode ray display device 244. A pen 246 is then used by the person who wishes to show that he is the correct card holder, for writing a signature corresponding to the one on his card. Signal processing circuits 248 such as those described in FIGS. 1 through 9 convert the signals received from the pen 246 into the coordinate signals which are then applied to a display device 250 to be displayed thereby. The signatures displayed on both display devices are then compared to determine whether or not the card holder is the individual who should be having it and using it.

Figure 12:
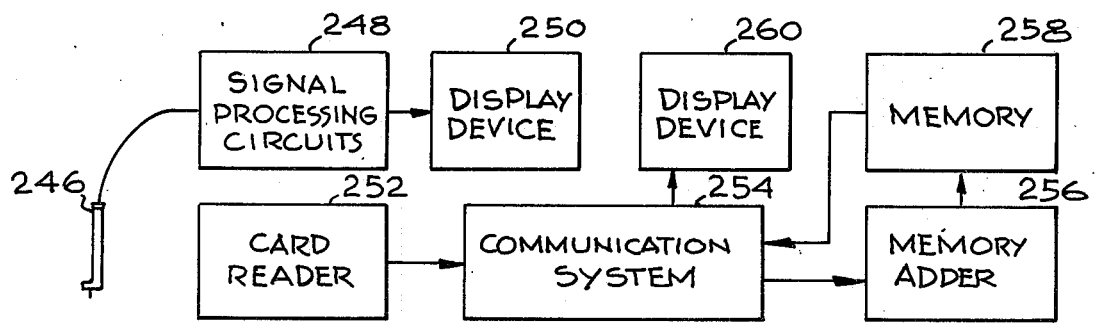

Another system for using this invention is schematically represented by FIG. 12. Here the pen 246 is used by the individual who wishes to be identified, to write a signature. The output of the pen 246 is applied to the processing circuit 248 which in turn produce the X and Y coordinate signals which are applied to the display device 250 to be displayed.

A card reader 252 is employed to read an address which is embossed or magnetically recorded on a card, which is the address in a central computer memory of the location where the coordinates of an original signature of the individual who was using the card is supposed to be stored. This address information is applied to a communication system 254, which supplies it to a memory address circuit 256, at a central location. The memory address circuit then addresses the memory 258, which provides as an output the $X_{ij}''$ and $Y_{ij}''$ coordinates. These are transmitted through the communication system 254 to a second display device 260, which is located at the place where the individual is signing his signature. A comparison of display devices 250 and 260 can then readily determine whether or not the card holder is indeed the individual who should be holding it.

Figure 13:
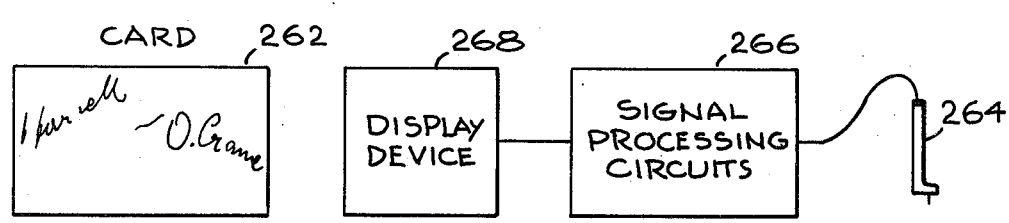

FIG. 13 shows still another way in which the system described may be used. A copy is made on a card of the appearance of a signature which has been processed and displayed on a CRT for example. The person who wishes his signature verified then uses the pen 264 to write his signature. The signals generated by the pen are processed by the processing circuits 266 and then displayed for comparison by the display device 268.

The system which has been described herein is one which not only can be built as a hardwired special purpose computer but also, those skilled in the art who are given this disclosure can program a general purpose computer to perform the sequence of processing steps required to convert the force signals generated by a pen into the coordinate signals $X_{ij}''$ and $Y_{ij}''$ which are either stored for further use or displayed.

Attached hereto, as an appendix to this specification, but still a part thereof, are flow charts illustrating the sequence followed by a general purpose computer in response to a program instructing it to perform the operations described herein. Also attached hereto is a computer print out of a program for a general purpose computer which instructs the computer to perform the processing of pen signals as described above, and then to display the coordinate signals which have been derived. The program instructs the computer to follow the sequence described in the flow charts.

Accordingly, it is intended that both the hardwired computer and a programmed general purpose computer

| Subroutine DYNAM: | Dynamic recreation of a signature |
|---|---|
| Input to the subroutine: | |
| (pi, xi, yi) | are the ith samples of pressure and the X and Y forces in the plane of the paper on which the signature is written. These are assumed to have been scaled to mean 0, standard deviation 1, i.e. $pi = (pi' - \bar{p})/Sp$ etc where pi is the pre-scaled value, $\bar{p}$ the pre-scaled average, and Sp the pre-scaled standard deviation. xi and yi are similarly scaled. |
| n | The number of samples. |
| Pmax, Pmin | the maximum and minimum pi values (calculated by the calling program). |
| INTMAX, INTMIN | The maximum and minimum display intensity values (15 and 0 for our Vector General Display) |
| $\Delta X$ | Increment added to the horizontal plot coordinate (currently 0.75, may be changed within the calling program) |
| $\Delta Y$ | Increment added to the vertical plot coordinate (currently 0.0, may be changed within the calling program) |
| $\Delta P$ | Increment added at each pen up, so each segment of the signature will be separate (currently 30.0, may be changed within the calling program) |

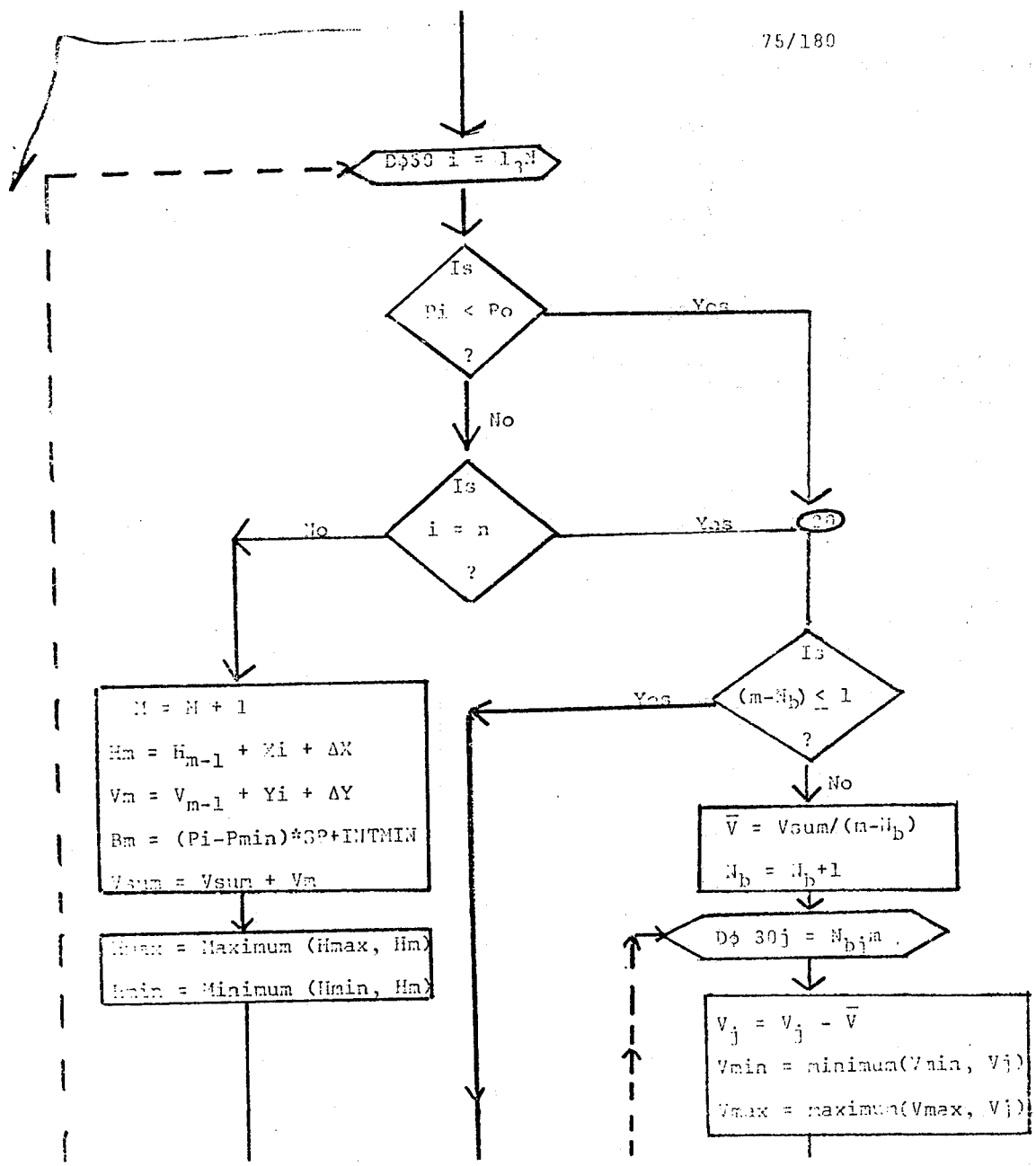

-continued
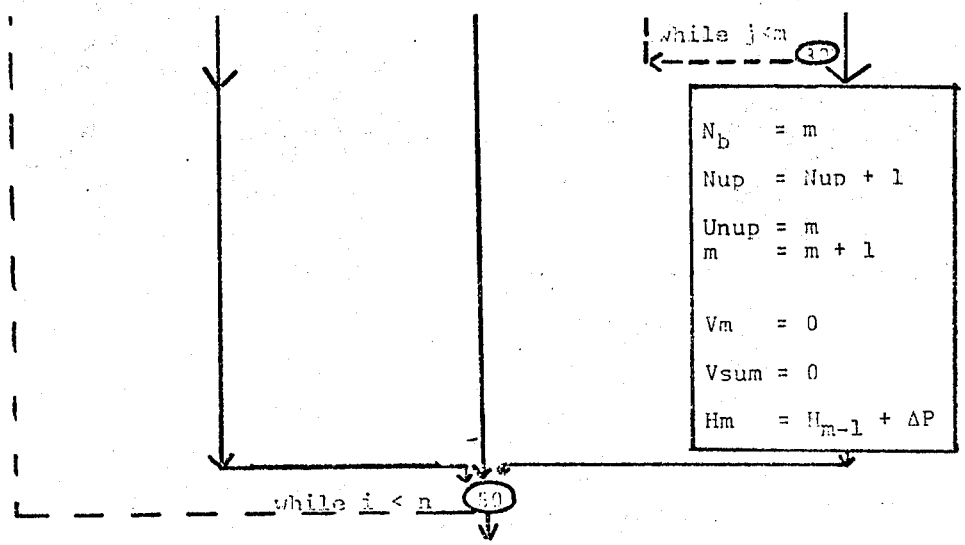
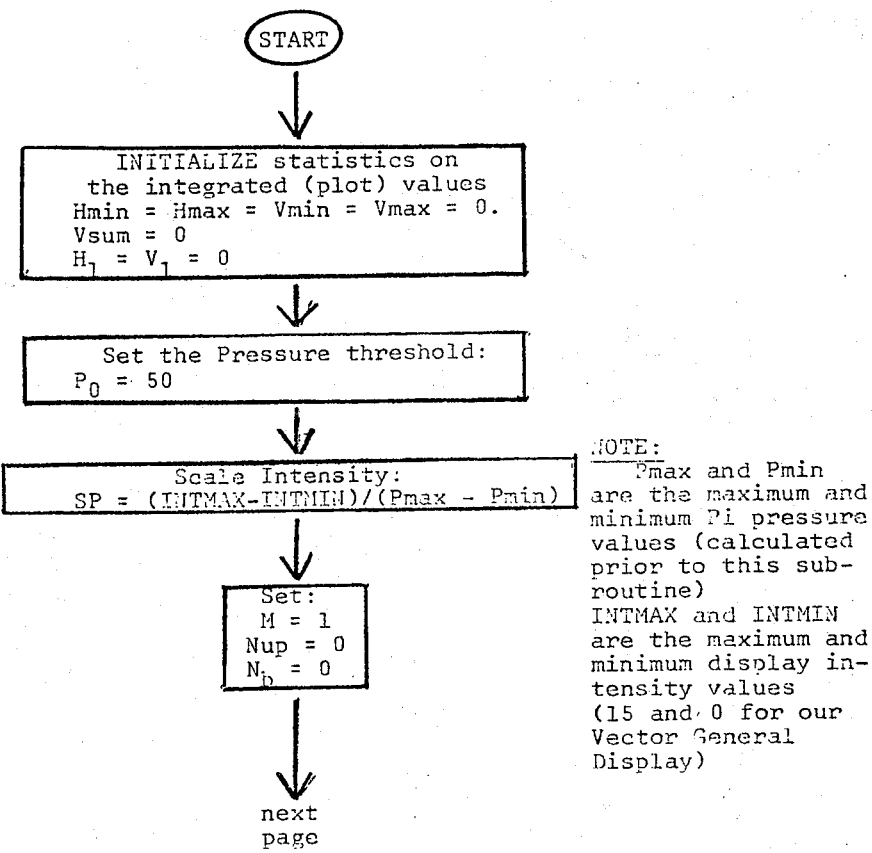
NOTE:
Pmax and Pmin are the maximum and minimum Pi pressure values (calculated prior to this subroutine)
INTMAX and INTMIN are the maximum and minimum display intensity values (15 and 0 for our Vector General Display)
next page

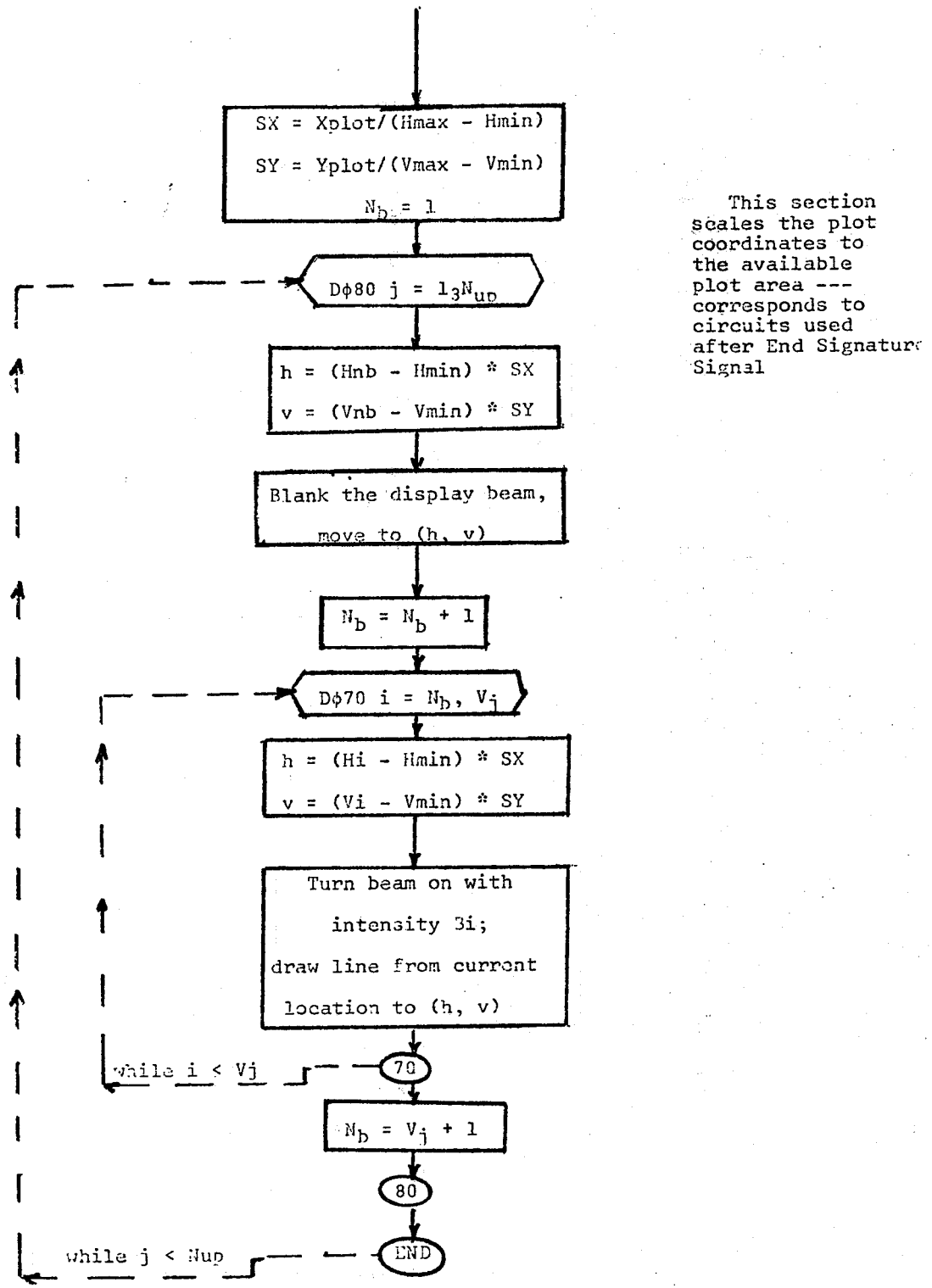
This section scales the plot coordinates to the available plot area --- corresponds to circuits used after End Signature Signal

```
C   SIG11.FTN

C   Program SIG11 .................
C
C   COPYRIGHT 1975 STANFORD RESEARCH INSTITUTE
C
C   signature inspection and verification program
C       Written for the PDP-11 computer -- Vector General display
C       Version 2, December 11, 1974
C
C   Allow an operator to - - - - - - - - - - - -
C       Call a program to allow the digitization of a signature using
C           Hew Crane's pen.
C       Display the time series derived from the signature
C       Create a facsimile of the static signature allowing the changing
C           of parameters used in the process
C       Compare the signature with an existing template giving the correlat
C       Update the template with new signatures
C
C   Written by
C       Dan Wolf, L2082, X3983
C       John Ostrem, K1065, X4432
C       STANFORD RESEARCH INSTITUTE
C       333 Ravenswood Ave.
C       Menlo Park, Calif., 94025
C       Phone (415) 326-6200
C-----------------------------------------------------------------
C   LINK
C       DK1:SIG11<DK1:S/CC,C/CC,D/CC,I,M,DEWLIB/CC,DK:FTNLIB[1,1]/L/U/E
C-----------------------------------------------------------------
        DIMENSION SAVE(18),INDBUF(4),TEXT(8),CTO(2)
        LOGICAL DEBUG,LHOLDT,CHANGE
        COMMON /DEBUG/   DEBUG,NPRINT
        COMMON /DATAHD/  NUMDAT,MAXDAT,LENDAT,NEXTDR
        COMMON /LUNS/    KB,LP,LD,LT
        COMMON /IOCOND/  INDEX1,IERR1,INDEX2,IERR2
        COMMON /PLOCS/   IHBEG(2),IVBEG,IHINC,IVINC
        COMMON /SIGNAL/  SIGNAT,AUTHOR,NDATE(5),NTIME(4),NSRATE
       +                ,NTOTIM,NUP,IPLPEN,RECID
       +                ,STAT(3,4),IPENUP(20),IDATA(256,3)
        COMMON /TEMPHD/  NUMTEM,MAXTEM,LENTEM
        COMMON /TMPLAT/  ITEMRN,TMPLAT,NUMSIG,MDATEM(5),MTIMEM(4),MPLPEN
       +                ,TSTA(3,4),ITEMP(256,3)
        COMMON /TRAN/    SCALES(3),BIASES(3)

C   Parameters for facsimile plot of signature
        COMMON /SIGPAR/  XINC,XUPINC,INTMAX,INTMIN
       +                ,APARAM,BPARAM,CPARAM C   scratch arrays
        COMMON IBUF(37)
C
        DATA  TRUE/4HTRUE/, BLANK/4H    /, T/4HT   /
        DATA  CTO/4HILL ,4HCHAR/,KONC/020203/
C-----------------------------------------------------------------
    1   FORMAT (1H1,5A2,5X,4A2)
   10   FORMAT (F6.3,F6.2,F6.1,F7.2,2F6.1
       +        ,I5' TO'I3,2X,2I5,4X,L1,I4,1X,A4)
   11   FORMAT (4HSIG ,A4,2X,5HAUTH ,A4,2X,A4,7X)
   12   FORMAT (9HTEMPLATE ,A4,I4,4X,5A2,1X)
   13   FORMAT (1X,A2,1X,O6)
C-----------------------------------------------------------------
C       Initialize key parameters
        CALL INIT(INDBOX)
        CALL INITFX(INDBOX,INDBUF,4)
        WGT    = 0.125
        AUTHOR = BLANK
        SIGNAT = BLANK
        TMPLAT = 0.0
        IF (NEXTDR .EQ. 0)  NEXTDR = 4
        NUMREC = NEXTDR - 1
        NUMSIG = 0
        NPLOT  = 0
        LHOLDT = .FALSE.
        NXTSUB = 0
```

```
C     start with a signature in core
          GO TO 2400

C-------------------------------------------------------------
C     display list of parameters
 1000     CALL SETIND(INDBUF(4))
          ENCODE (74,13,IBUF)  WGT,XINC,XUPINC,APARAM,BPARAM,CPARAM
         +          ,INTMIN,INTMAX,NPRINT,NPLOT,LHOLDT,NUMREC,RECID
          CALL INTSET(3)
          CALL MOVBM(-1840,-1856)
          CALL CHARS(IBUF,37,1)
          CALL GETIND(INDCHA)
C     get character from display keyboard
 1005     IF (LCHAR(ICH) .EQ. 0)  GO TO 1005
C     print the character
          WRITE (LP,13)  ICH,ICH
C     display the character
          CALL SETIND(INDCHA)
          CALL MOVBM(-1940,-1856)
          CALL CHARS(ICH,1,1)
C     Control C allows the operator to change initials of the
C     signature and author
          IF(ICH .EQ. KONC)  GO TO 4100
C     space selects previous command
          IF (ICH .EQ. ' ')  GO TO 1018
C     check for upper case alpha characters
          JCH = ICH - 'A' + 1
          IF (ICH.GE.'A' .AND. ICH.LE.'Z')  GO TO 1020
C     check for lower case alpha characters
          JCH = ICH - 'a' + 1
          IF (ICH .LT. 'a')  GO TO 1010
          IF (ICH .LE. 'z')  GO TO 1020
C     illegal character
 1010     CONTINUE
          CALL MOVBM(-1930,-1020)
          CALL CHARS(CTC, 4, 1)
          GO TO 1005
C     make sure previous command was legal
 1018     IF (JCH.LT.1 .OR. JCH.GT.26)  GO TO 1310
C     select proper option for the character
C              A 1   B 2   C 3   D 4   E 5   F 6   G 7   H 8   I 9   J10
C              K11   L12   M13   N14   O15   P16   Q17   R18   S19   T20
C              U21   V22   W23   X24   Y25   Z26
 1020     GO TO (1010,1010,1300,1400,9000,1010,1010,1800,1010,1010
         +      ,1010,2200,2300,2400,1010,2600,9000,2800,2900,3300
         +      ,3100,1010,3300,3400,1010,3600), JCH
C-------------------------------------------------------------
C     compare signature with existing template
 1300     CONTINUE
C1303     DEBUG = NPRINT.GT.10
C         IF (DEBUG) WRITE (LP,1301) TMPLAT,NUMTEM,SIGNAT,AUTHOR,RECID
C1301     FORMAT (15H0COMPARE, TEMP=,A4,I3,6H  SIG=,A4,2A5)
          IF (TMPLAT .EQ. SIGNAT)  GO TO 1310
C     if no templates -- abort
          IF (NUMTEM .LE.  0)  GO TO 1310
          IF (NUMTEM .GT. 100)  GO TO 1010
C     get record number of correct template
          DO 1302  I=1,NUMTEM
          ITEMRN = I
          READ (LT'ITEMRN)  TMPLAT,NUMSIG,MDATEM,MTIMEM
         +                 ,MPLPEN,TSTA,ITEMP
          IF (TMPLAT .EQ. SIGNAT)  GO TO 1304
 1302     CONTINUE
C     no such template
          GO TO 1010
C     bring correct template into core (if none -- abort)
 1304     CONTINUE
C         IF (DEBUG) WRITE (LP,1306)  TMPLAT,NUMSIG,MDATEM,MTIMEM
C1306     FORMAT (' READ TEMPLATE',A5,I3,2X,5A2,2X,4A2)
C     make sure template consists of at least one signal
 1310     IF (NUMSIG .LT. 1)  GO TO 1010
          WRITE (LP,1311)  TMPLAT,ITEMRN,NUMSIG,MDATEM,MTIMEM
         +                ,SIGNAT,AUTHOR,RECID,NSRATE,NUP,NTOTIM,NDATE,NTIME
 1311     FORMAT ('0compare template for'A5,2I4,3X,5A2,2X,4A2
         +       /'          with       '3A5,3I5,3X,5A2,2X,4A2)
```

```
 1320      IF(LCHAR(JJ) .EQ. 0) GO TO 1320
           CALL MOVBM(-1890,-1856)
           CALL CHARS(JJ,1,1)
           IF(JJ .EQ. 'B' .OR. JJ .EQ. 'b') GO TO 1330
           IF(JJ .EQ. 'H' .OR. JJ .EQ. 'h') GO TO 1340
           IF(JJ .EQ. 'T' .OR. JJ .EQ. 't') GO TO 1330
           GO TO 1320
C     Correlation between pen ups (landmarks)
 1330      CALL LANDMK(IDATA,ITEMP,JJ,COR,STAT,SAVE)
           IF(COR .GT. -1.0) GO TO 1005
C     time justify -- P+X+Y lock, halves
 1340      CALL SEARCH(ITEMP,IDATA,  1,  128, SAVE( 1), 3,256,STAT)
           CALL SEARCH(ITEMP,IDATA,129,  128, SAVE(10), 3,256,STAT)
C          COMPUTE AND DISPLAY OVERALL CORRELATION
           CALL CADCOR(SAVE,.FALSE.,COR)
           GO TO 1005
C     - - - - - - - - - - - - - - - - - - - - - - - - - -
C     debugging printout switch
 1400      OLD    = NPRINT
           NPRINT = VALUE('DBUG',OLD,CHANGE)
           GO TO 1000
C     - - - - - - - - - - - - - - - - - - - - - - - - - -
C     Change facsimile (dynamic) plot parameters
C           X = X increment    0,P = pen up X increment
C           M = multiplier for P    A = additive constant for P
C1600      IF (ICH .EQ. ' ') GO TO 1610
C1605      IF (LCHAR(JJ) .EQ. 0) GO TO 1605
C          CALL MOVBM(-1890,-1856)
C          CALL CHARS(JJ,1,1)
C1610      IF (JJ.EQ.'A' .OR. JJ.EQ.'a')  GO TO 1640
C          IF (JJ.EQ.'B' .OR. JJ.EQ.'b')  GO TO 1670
C          IF (JJ.EQ.'0')                 GO TO 1620
C          IF (JJ.EQ.'P' .OR. JJ.EQ.'p')  GO TO 1620
C          IF (JJ.EQ.'M' .OR. JJ.EQ.'m')  GO TO 1630
C          IF (JJ.EQ.'I' .OR. JJ.EQ.'i')  GO TO 1660
C          IF (JJ.EQ.'X' .OR. JJ.EQ.'x')  GO TO 1650
C          GO TO 1605
C1620      XUPINC = VALUE('P UP',XUPINC,CHANGE)
C          GO TO 1690
C1630      APARAM = VALUE('MULT',APARAM,CHANGE)
C          GO TO 1690
C1640      BPARAM = VALUE('Xadd',BPARAM,CHANGE)
C          GO TO 1690
C1650      XINC   = VALUE('Xinc',XINC   ,CHANGE)
C          GO TO 1690
C1660      OLDMIN = INTMIN
C          INTMIN = VALUE('IMIN',OLDMIN,CHANGE)
C          INTMIN = MAX0(-16,MIN0(INTMIN,15))
C          OLDMAX = INTMAX
C          INTMAX = VALUE('IMAX',OLDMAX,CHANGE)
C          INTMAX = MAX0(-16,MIN0(INTMAX,15))
C          CHANGE = (OLDMAX.NE.INTMAX).OR.(OLDMIN.NE.INTMIN)
C          GO TO 1690
 1670      CPARAM = VALUE('Yadd',CPARAM,CHANGE)
C     re-generate facsimile plots
C1690      IF (CHANGE) GO TO 2440
C          GO TO 1000
C
C     - - - - - - - - - - - - - - - - - - - - - - - - - -
C     flag for holding plot of template fixed while changing sig plot
 1800      LHOLDT = .NOT.LHOLDT
           GO TO 1000
C     - - - - - - - - - - - - - - - - - - - - - - - - - -
C     List contents of data file on printer
 2200      WRITE (LP,1) NDATE,NTIME
 2201      FORMAT ('0DATA FILE'2I5/5X'SIG DEV  AUTH REC  RATE TIME P UP')
 2202      FORMAT (1X,I2,2X,A4,I3,2A5,3I5,2X,5A2,2X,4A2 )
 2203      FORMAT ('0 TEMPLATE FILE' 2I5)
 2204      FORMAT (10X,A6,2I5,5X,5A2,3X,4A2)
 2205      FORMAT (10X'SIGNAT DEVICE NUM'5X'Last Modified')
C     Contents of data file
           WRITE (LP,2201) NUMDAT,MAXDAT
           DO 2210 I=1,NUMDAT
             READ (LD'I) SIGNAT,AUTHOR,NDATE,NTIME,NSRATE
      +         ,NTOTIM,NUP,IPLPEN,RECID
             WRITE (LP,2202) I,SIGNAT,IPLPEN,AUTHOR,RECID,NSRATE
      +                     ,NTOTIM,NUP,NDATE,NTIME
```

```
2210      CONTINUE
          READ (LD'NUMREC) SIGNAT,AUTHOR,NDATE,NTIME,NSRATE
         +       ,NTOTIM,NUP,IPLPEN,RECID
C    Contents of template file
          WRITE (LP,2203) NUMTEM,MAXTEM
          WRITE (LP,2205)
          DO 2220 I=1,NUMTEM
            READ (LT'I) TMPLAT,NUMSIG,MDATEM,MTIMEM,MPLPEN
            WRITE (LP,2204) TMPLAT,MPLPEN,NUMSIG,MDATEM,MTIMEM
2220      CONTINUE
          TMPLAT = 0.0
          NUMSIG = 0
          GO TO 1005
C   ------------------------------------------
C    exit to MAE (text editor)
2300      NXTSUB = 1
          GO TO 9000
C   ------------------------------------------
C    read the next record from the data file and display it
2400      IF (NUMDAT .EQ. 0) GO TO 1010
C         DEBUG = NPRINT.GT.50
          CALL INITRL(0.0,SAVE,18)
          NUMREC = NUMREC + 1
          IF (NUMREC .LT. 1       ) NUMREC = 1
          IF (NUMREC .GT. NUMDAT) NUMREC = 1
          READ (LD'NUMREC) SIGNAT,AUTHOR,NDATE,NTIME,NSRATE
         +           ,NTOTIM,NUP,IPLPEN,RECID,STAT,IPENUP,IDATA C    make sure template is plotted on the left side of screen
C         IF (DEBUG) WRITE (LP,2402) NUMREC,SIGNAT,AUTHOR,RECID,NDATE
C2402     FORMAT ('0READ SIGNATURE'I5,5X,3A5,2X,5A2)
          IF (SIGNAT .EQ. TMPLAT) GO TO 2430
          IF (    LHOLDT      ) GO TO 2430
C    Need new template
          IF (NUMTEM .EQ. 0) GO TO 2430
          DO 2410 I=1,NUMTEM
            ITEMRN = I
            READ (LT'ITEMRN) TMPLAT,NUMSIG,MDATEM,MTIMEM,MPLPEN
         +                   ,TSTA,ITEMP
            IF (TMPLAT .EQ. SIGNAT) GO TO 2420
2410      CONTINUE
C    no such template
          NUMSIG = 0
          TMPLAT = 0.0
          GO TO 2430

C    jump here after changing template (T- OR U commands)
2420      CALL SETIND(INDBOX)
          CALL INITFX(INDBOX,INDBUF,4)
          IF (NUMSIG .EQ. 0) GO TO 2430
          ENCODE (32,12,TEXT) TMPLAT,NUMSIG,MDATEM
          IF (NPLOT.NE.2) CALL TSPLOT(1,TEXT,ITEMP,TSTA)
          CALL GETIND(INDBUF(1))
C    display the signature
2430      ENCODE (32,11,TEXT) SIGNAT,AUTHOR,RECID
          CALL SETIND(INDBUF(1))
          IF (NPLOT.NE.2) CALL TSPLOT(2,TEXT,IDATA,STAT)
          CALL GETIND(INDBUF(2))

C    draw facsimile plot of signature and template
C       (also jump here when changing facsimile plot parameters)
2440      IF (  LHOLDT   ) GO TO 2450
          CALL SETIND(INDBUF(2))
          CALL GETIND(INDBUF(3))
          IF (NUMSIG .EQ. 0) GO TO 2450
          IF (NPLOT  .EQ. 1) GO TO 2450
          CALL DYNAM (1,ITEMP,TSTA)
          CALL GETIND(INDBUF(3))
2450      CALL SETIND(INDBUF(3))
          IF (NPLOT.NE.1) CALL DYNAM (2,IDATA,STAT)
          CALL GETIND(INDBUF(4))
          GO TO 1000
C   ------------------------------------------
C    specify type of plot -- NPLOT=1=only TSPLOT, NPLOT=2=only DYNAM
2500      OLD    = NPLOT
```

```
              NPLOT  =  VALUE(4HPLOT,OLD    ,CHANGE)
              IF (CHANGE) GO TO 2420
              GO TO 1005
C     - - - - - - - - - - - - - - - - - - - - - - - - - - - - - -
C     Get data record number from operator
 2800         OLD    =  NUMREC
              NUMREC =  VALUE(4HNREC, OLD,CHANGE) - 1.0
              IF (CHANGE) GO TO 2420
              NUMREC =  OLD
              GO TO 1005
C     - - - - - - - - - - - - - - - - - - - - - - - - - - - - - -
C     sample A/D -- take signature in program SAMPLE
 2900         CONTINUE
              NEXTDR = NUMDAT + 1
              IF (ICH .NE. 'S') GO TO 2930
C     Capital S allows opertor to enter number of record to overwrite
 2920         OLD    = NEXTDR
              NEXTDR = VALUE('NREC',OLD,CHANGE)
              IF (NEXTDR.LT.1 .OR. NEXTDR.GT.NUMDAT+1) GO TO 2920
C     write parameters on file for use by SAMPLE
 2930         NXTSUB = 2
              MAXREC = MAXDAT + 1
              WRITE (LD'MAXREC) NUMDAT,MAXDAT,LENDAT,NEXTDR
             +                  ,SIGNAT,AUTHOR,NPRINT
              GO TO 9000
C     - - - - - - - - - - - - - - - - - - - - - - - - - - - - - -
C     allow templates to be modified ...............
C         A = add signal to template (also U)
C         S = subtract signal from template
C         Z = zero template
 3000         CONTINUE
C             DEBUG  = NPRINT.GT.50
C             IF (NPRINT .EQ. 99) DEBUG = .TRUE.
              IF (ICH   .NE. ' ') JJ     = 0
C     don't allow modification of template by forgeries
C             IF (DEBUG) WRITE (LP,3001) SIGNAT,AUTHOR,TMPLAT,NUMSIG
C3001         FORMAT ('0MODIFY TEMPLATE',3A5,I3)
              IF (AUTHOR .NE. TRUE) GO TO 1010
 3005         CALL MODIFY(JJ,SAVE,WGT,IERR)
              IF (IERR .GT.  0) GO TO 1010
              IF (IERR .EQ. -1) GO TO 3300
              IF (IERR .EQ. -2) GO TO 1005
              GO TO 2420
C     - - - - - - - - - - - - - - - - - - - - - - - - - - - - - -
C     Update the template (same as TU above)
 3100         IF (AUTHOR .NE. TRUE) GO TO 1010
              JJ     = 'U'
C             DEBUG  = NPRINT .GT. 50
C             IF (NPRINT .EQ. 99) DEBUG = .TRUE.
C             IF (DEBUG) WRITE (LP,3101) SIGNAT,AUTHOR,TMPLAT,NUMSIG
C3101         FORMAT ('0UPDATE TEMPLATE',3A5,I3)
              GO TO 3005
C     - - - - - - - - - - - - - - - - - - - - - - - - - - - - - -
C     weight for updating template -- must be between 0 and 1
 3300         OLD    = WGT
              WGT    = VALUE('WGT', WGT, CHANGE)
              IF (WGT.GT.0.0 .AND. WGT.LE.1.0) GO TO 1000
              WGT    = OLD
              GO TO 3300
C     - - - - - - - - - - - - - - - - - - - - - - - - - - - - - -
C     transfer to verify program
 3400         NXTSUB = 3
              GO TO 9000
C     - - - - - - - - - - - - - - - - - - - - - - - - - - - - - -
C     Zero either the template or a specified data record
 3600         IF (LCHAR(JJ) .EQ. 0) GO TO 3620
              CALL MOVBM(-1890,-1856)
              CALL CHAPS(JJ,1,1)
              IF (JJ.EQ.'R' .OR. JJ.EQ.'r') GO TO 3610
              IF (JJ.EQ.'T' .OR. JJ.EQ.'t') GO TO 3620
              GO TO 1012

3610         CONTINUE
              GO TO 1000
```

```
3620      JJ = 'Z'
          GO TO 3095
C     ------------------------------------------------
C     Control C allows the operator to change the initials
C         of the author of signature of the current record
4100      SIGNAT = GETEXT ('SIGN',SIGNAT)
          AUTHOR = GETEXT ('AUTH',AUTHOR)
          IF (AUTHOR .EQ. SIGNAT)  AUTHOR=TRUE
          IF (AUTHOR .EQ. T    )   AUTHOR=TRUE
C     Write new initials onto disk file --
C         NOTE -- must write entire record
          WRITE (LD'NUMREC)  SIGNAT,AUTHOR,NDATE,NTIME,NSRATE
         +           ,NTOTIM,NUP,IPLPEN,RECID,STAT,IPENUP,IDATA
C     Note also code does not update display of initials of
C         signature and author
          GO TO 1005
C     ------------------------------------------------
C     exit to monitor
9000      CONTINUE
          ENDFILE LD
          ENDFILE LT
          CALL CPOFF
          IF (NXTSUB .EQ. 1)  CALL RUN('DK0:MAE')
          IF (NXTSUB .EQ. 2)  CALL RUN('DK1:SAMPLE')
          IF (NXTSUB .EQ. 3)  CALL RUN('DK1:SIGVER')
          STOP
C     ------------------------------------------------
      END C     ------------------------------------------------
      SUBROUTINE LANDMK(IDATA,ITEMP,JJ,COR,STAT,SUMS)

C     COPYRIGHT 1975 STANFORD RESEARCH INSTITUTE
C     16-OCT-75
C     Calculate correlation between penups:   JJ = 't' for total
C                                              JJ = 'b' for between
C
C     - - - - - - - - - - - - - - - - - - - - - - - -
C
          LOGICAL DEBUG
          DIMENSION IDATA(256,3),ITEMP(256,3),SUMS(18)
          COMMON KBUF(256,3),IUP(40),JUP(40)
          COMMON /DEBUG/  DEBUG,NPRINT C     - - - - - - - - - - - - - - - - - - - - - - - -
C
C     Compute pen down information:  I=signal, J=template
C
          DEBUG = NPRINT.EQ.-56
          COR = -1.0
          NI = 0
          NJ = 0
          MINT = ITEMP(1,1) + 50
          MINS = IDATA(1,1) + 50

DO 140 I=1,256
             IF(ITEMP(I,1) .GT. MINT) GO TO 110
             IF(MOD(NJ,2) .EQ. 0) NJ=MIN0(NJ+1,30)
             JUP(NJ) = I
             GO TO 120
110          IF(MOD(NJ,2) .EQ. 1) NJ=MIN0(NJ+1,40)
             JUP(NJ) = I+1
120          IF(IDATA(I,1) .GT. MINS) GO TO 130
             IF(MOD(NI,2) .EQ. 0) NI=MIN0(NI+1,30)
             IUP(NI) = I
             GO TO 140
130          IF(MOD(NI,2) .EQ. 1) NI=MIN0(NI+1,40)
             IUP(NI) = I+1
140       CONTINUE
C         IF(DEBUG) PRINT 150, NI,NJ,IUP,JUP
C 150     FORMAT(I5,5X,I5,/(5X,10I5))
C     - - - - - - - - - - - - - - - - - - - - - - - -
```

```
C     Algorithm is valid only when template and sample signature have an
C     identical number of pen-ups

IF(NI .NE. NJ) RETURN

C     - - - - - - - - - - - - - - - - - - - - - - - - - - - - - - - - -

C     Stretch data between pen-ups

J1 = 1
           N  = NI/2
           CALL INITRL(0.0,SUMS,18)
           DO 240 I=1,N
              IB = IUP(2*I-1)
              JB = JUP(2*I-1)
              NI = IUP(2*I) - IB+1
              NJ = JUP(2*I) - JB+1
C             IF(DEBUG) PRINT 160, I,N,J1,IB,JB,NI,NJ
C 160         FORMAT(//7I8)
              CALL NORMAL(IDATA(IB,1),NI,KBUF(JB,1),NJ,3,256)
C             CALL TSOVER(KBUF(JB,1),STAT,JB,3,256)
              J2 = JB-1
              IF(J2 .LT. J1) GO TO 220
              DO 210 J=J1,J2
                 DO 210 K=1,3
                    KBUF(J,K) = IDATA(1,K)
  210         CONTINUE
  220         J1 = JB + NJ
              IF(JJ.EQ.'T' .OR. JJ.EQ.'t') GO TO 240

C     - - - - - - - - - - - - - - - - - - - - - - - - - - - - - - - - -

C     Landmark matching between pen-ups

BEST = -1.0
              LEAD =  0
              CALL JUST(ITEMP(JB,1),KBUF(JB,1),NJ,3,256,SUMS(10),BEST,
        +              LEAD,6)
              IF(I .EQ. N) GO TO 240
              DO 230 J=1,6
                 SUMS(J) = SUMS(J) + SUMS(J+9)
  230         CONTINUE
  240      CONTINUE

C     - - - - - - - - - - - - - - - - - - - - - - - - - - - - - - - - -

IF(JJ.EQ.'B' .OR. JJ.EQ.'b') GO TO 320

C     - - - - - - - - - - - - - - - - - - - - - - - - - - - - - - - - -

C     Landmark matching for the total signal

BEST = -1.0
           LEAD =  0
           CALL JUST(ITEMP,KBUF,JUP(2*N),3,256,SUMS(10),BEST,LEAD,6)

C     - - - - - - - - - - - - - - - - - - - - - - - - - - - - - - - - -

C     Display the correlation
  320      CALL CADCOR(SUMS,.FALSE.,COR)
           RETURN

C     - - - - - - - - - - - - - - - - - - - - - - - - - - - - - - - - -

END

C     SAMPLE.FTN

C     Program SAMPLE
C        Sample the output from Hew Crane's pen.
C
C        This is the third version of this program. It allows the operator
C        to change some parameters before sampling the pen.
C           S  identification (initials) of the signature
C           A  identification (initials) of the author (person writing)
C           R  record number in disk file for storing the data
```

```
C           F  sampling frequency
C           P  Switch input device code from pen to platen
C
C    Assume platen or pen output channels are connected to channels 1-3.
C
C  Version 3A, December 12, 1974
C
C
C
C LINK..
C      DK1:SAMPLE<DK1:SAMPLE/CC,PEN120,DEWLIB/CC,DK:FTNLIB[1,1]/L/U/E
C----------------------------------------------------------------------
       LOGICAL DEBUG,CHANGE
       COMMON /DATAHD/  NUMDAT,MAXDAT,LENDAT,NEXTDR
       COMMON /SIGNAL/  SIGNAT,AUTHOR,NDATE(5),NTIME(4),NSRATE
      +        ,NTOTIM,NUP,IPLPEN,RECID,STAT(3,4),IPENUP(20),IDATA(256,3)
C  This COMMON for the display routines
       COMMON /VGD1/  INDISP,MAXDIS,DISBUF(3000)

DIMENSION SCALES(3),BIASES(3),IRATES(6),IARRAY(6)
      +          ,STATID(2,10),BEFORE(3,10),AFTER(3,10),DEVICE(3)
       DIMENSION JDATA(1500,3),IRECID(2),IZEROS(3)
       DIMENSION CT01( 8),CT02(7),CT03(6),CT04 (6),CT05 (5),CT06(12)
      +          ,CT07(10),CT08(6),CT09(4),CT010(4),CT011(5),CT012(4)
       EQUIVALENCE (IRECID,RECID)

DATA CT01/'RATE',' SIG','NAT ','AUTH','OR R','ECOR','D DE','VICE'/
       DATA CT02 /4HTo c,4Hhang,4He pa,4Hrame,4Hters,4H, ty,4Hpe  /
       DATA CT03 /4HS fo,4Hr Si,4Hgnat,4Hure ,4Hinit,4Hials/
       DATA CT04 /4HA fo,4Hr Au,4Hthor,4H ini,4Htial,4Hs    /
       DATA CT05 /4HR fo,4Hr Re,4Hcord,4H num,4Hber /
       DATA CT06 /'F fo','r sa','mpli','ng F','requ','ency'
      +           ,', 12','0,60','',40,','30,2','4,20',' Hz '/
       DATA CT07 /'P sw','itch','i dev','ice ','type',' fro'
      +           ,'m Pe','n to',' Pla','ten '/
       DATA CT08 /'SPAC','E to',' beg','in s','ampl','ing '/
       DATA CT09 /'Type',' A t','o ab','ort '/
       DATA CT010/4HSTAR,4HT WR,4HITIN,4HG   /
       DATA CT011/4HSIGN,4HATUR,4HE CO,4HMPLE,4HTE  /
       DATA CT012/4HTOO ,4HMANY,4HSAMP,4HLES /

DATA   SCALES/3*1000.0/, BIASES/3*0.0/
       DATA   IRATES/120,60,40,30,24,20/
       DATA   MAXPTS/1500/,TRUE/'TRUE',T/'T   '/,ICR/020015/
       DATA   DEVICE/'Plat','Pen ','Both'/
       DATA   STATID  /  'Ave ','    ','SDV ','    ','Max ','    '
      +       ,'Min ','    ','Ave ','Abs ','Ave ','Pos ','Num ','Pos '
      +       ,'Ave ','Neg ','Num ','Neg ','0 Xi','ngs '/
C----------------------------------------------------------------------
  2    FORMAT (I3,2A7,I6,A8,1X)
  3    FORMAT (22X'T O T A L   POINTS    ZERO LEVELS'
      +        /' SIGNAT AUTHOR RECORD SAMPLES   TIME   KEPT '
      +        ,'    P   X   Y'4X'D A T E    TIME')
  4    FORMAT (1X,A5,4X,A4,2I7,F7.2,I7,3X,3I4,3X,5A2,2X,4A2
      +        //4X' Pen Down Times'/(7X,5(2X,I4'-'I4)))
  5    FORMAT ('R',I2,1X)

21   FORMAT (//' Pre normalized points'I5/(1X,I4,3I5))
  22   FORMAT (//' 256 points'/(1X,I4,3I5))
  24   FORMAT (//' Mean 0, Sdv 1000, 256 points'/(1X,I4,3I5))

31   FORMAT (//29X'D U R A T I O N'
      +         /21X'NUMBER  SAMPLES    TIME'
      +         /10X' PEN UP  'I5,I9,F9.2
      +         /10X' PEN DOWN 'I5,I9,F9.2)
  32   FORMAT (/5X'STATISTICS'/18X'IN   ORIGINAL     SAMPLES'7X
      +        'N O R M A L I Z E D   UNITS'/9X,2(12X'P'8X'X'8X'Y'))
  33   FORMAT (7X,2A4,3F9.2,4X,3F9.2)
C----------------------------------------------------------------------
C   Set default value of parameters
       IPLPEN = 2
       IRATE  = 2
       NSRATE = IRATES(IPATE)
       CALL SETERR(6,-1)
       CALL DATE(NDATE)
       CALL TIME(NTIME)
```

```
C     Read data file header
      MAXREC = 51
      LENDAT = 831
      CALL SETFIL(1,'SIG11.DAT',IERR1,'DK',1)
      DEFINE FILE 1(MAXREC,LENDAT,U,INDEX1)
      READ (1'MAXREC) NUMDAT,MAXDAT,LENDAT,NEXTDR
     +               ,SIGNAT,AUTHOR,NPRINT
      DEBUG = NPRINT.NE.0
C     Set up display
      MAXDIS = 6000
      CALL DPON
      CALL MOVBM(-2047,-2047)
      CALL IVECT(-2047, 2047,0)
      CALL IVECT( 2047, 2047,0)
      CALL IVECT( 2047,-2047,0)
      CALL IVECT(-2047,-2047,0)
      CALL MOVBM(-2000,0)
      CALL CHARS(CT01,16,1)
      CALL GETIND(IND)
C-------------------------------------------------------------
C     Allow the operator to change parameters
  100 CALL SETIND(IND)
      CALL MOVBM(-2000, -192)
      CALL CHARS(CT02,13,2)
      CALL MOVBM(-1800, -256)
      CALL CHARS(CT03,12,1)
      CALL MOVBM(-1800, -320)
      CALL CHARS(CT04,12,1)
      CALL MOVBM(-1800, -384)
      CALL CHARS(CT05,10,1)
      CALL MOVBM(-1800, -448)
      CALL CHARS(CT06,24,1)
      CALL MOVBM(-1800, -512)
      CALL CHARS(CT07,23,1)
      CALL MOVBM(-2000, -640)
      CALL CHARS(CT09,12,2)
      CALL GETIND(INDCHA)
C     Update list of parameters
  110 CALL SETIND(INDCHA)
      ENCODE (32,2,IDATA) IRATES(IRATE),SIGNAT,AUTHOR,NEXTDR
     +                   ,DEVICE(IPLPEN)
      CALL MOVBM(-2000, -64)
      CALL CHARS(IDATA,16,1)
  120 IF (LCHAR(ICH) .EQ. 0)  GO TO 120
      IF (ICH.EQ.'S' .OR. ICH.EQ.'s')  GO TO 200
      IF (ICH.EQ.'A' .OR. ICH.EQ.'a')  GO TO 300
      IF (ICH.EQ.'R' .OR. ICH.EQ.'r')  GO TO 400
      IF (ICH.EQ.'F' .OR. ICH.EQ.'f')  GO TO 500
      IF (ICH.EQ.'P' .OR. ICH.EQ.'p')  GO TO 600
      IF (ICH.EQ.' '              )   GO TO 900
      IF (ICH.EQ.ICR              )   GO TO 900
      IF (IBUTTN(I) .NE. 0        )   GO TO 900
      GO TO 120
C     -----------------------------------------------------
C     Identification of the Signature
  200 SIGNAT = GETEXT('SIGN',SIGNAT)
      IF (SIGNAT .EQ. AUTHOR)  AUTHOR = TRUE
      GO TO 110
C     -----------------------------------------------------
C     Identification of the Author
  300 AUTHOR = GETEXT('AUTH',AUTHOR)
      IF (AUTHOR .EQ. SIGNAT)  AUTHOR = TRUE
      IF (AUTHOR .EQ. T     )  AUTHOR = TRUE
      GO TO 110
C     -----------------------------------------------------
C     Number of disk record to store data on
  400 OLD    = NEXTDR
      NEXTDR = VALUE('REC ', OLD, CHANGE)
      GO TO 110
C     -----------------------------------------------------
C     Sample frequency rate
  500 OLD = IRATES(IRATE)
      I   = VALUE('RATE', OLD, CHANGE)
      IF (.NOT. CHANGE) GO TO 120
      DO 510  IRATE = 1,6
```

```
          IF (IRATES(IRATE) .LE. 1) GO TO 520
510       CONTINUE
          IRATE = 2
520       GO TO 110
C     ----------------------------------------
C     Change device type from pen to platen (or vice versa)
600       IPLPEN = 3 - IPLPEN
          GO TO 110
C     ----------------------------------------
900       IF (NEXTDR.GT.0 .AND. NEXTDR.LE.50) GO TO 1000
C-----------------------------------------------------------
C     Force operator to wipe out a record -- if bad value -- abort
          OLD    = NEXTDR
          NEXTDR = VALUE('REC ',OLD,CHANGE)
          IF (NEXTDR .LT. 1      ) GO TO 9020
          IF (NEXTDR .GT. MAXDAT) GO TO 9030
C-----------------------------------------------------------
C     Loop to sample pen, save only PEN>0, count the number of pen-ups
C     Use algorithms developed on the 6400.
C     Sample keyboard within loop -- if char -- abort
1000      CONTINUE
          CALL SETIND(IND)
          ENCODE (32,2,IDATA) IRATES(IRATE),SIGNAT,AUTHOR,NEXTDR
     +                        ,DEVICE(IPLPEN)
          CALL MOVBM(-2040,-64)
          CALL CHARS(IDATA,16,1)
          CALL MOVBM(-2000,-2000)
          CALL CHARS(CTC9,8,1)
C     Initialize counters for sampling
          NUMPTS = 0
          NZEROS = 0
          CALL MOVBM(-1200,-1200)
          CALL CHARS(CTC10,7,3)
          CALL AIPSET(2)
C     First 5 samples set zero level
          IZEROS(1) = 0
          IZEROS(2) = 0.
          IZEROS(3) = 0
          CALL PENON(IRATE)
          DO 1020 I=1,5
            CALL PENVAL(IARRAY,IFLAG)
C           Y from pen and plate are positive down--should be + up
            IARRAY(3) = -IARRAY(3)
C           Plate has pressure from 0 to -5 volts (23 Nov 74)
            IF (IPLPEN .EQ. 1) IARRAY(1) = -IARRAY(1)
            DO 1010 K=1,3
              IZEROS(K) = IZEROS(K) + IARRAY(K)
1010        CONTINUE
1020      CONTINUE
          DO 1030 K=1,3
            IZEROS(K) = (IZEROS(K)+2)/5
1030      CONTINUE
          IPCUT = IZEROS(1) + 50
          NZEROS = 5
          NUP    = 0
          NSAMPS = 5
          CALL MOVBM(-2040,IARRAY(1)+1024)
          CALL GETIND(INDBOX)

C     Main loop to gather samples starts here
1100      CONTINUE
          IF (LCHAR(ICH) .NE. 0) GO TO 2000
          CALL PENVAL(IARRAY,IFLAG)
C         Y from pen and plate are positive down--should be + up
          IARRAY(3) = -IARRAY(3)
C         Plate has pressure from 0 to -5 volts (23 Nov 74)
          IF (IPLPEN .EQ. 1) IARRAY(1) = -IARRAY(1)
          CALL SETIND(INDBOX)
C     Display time series of pressure -- must be before LOST message
          CALL AXVECT(IARRAY(1)+1024, 0)
          CALL GETIND(INDBOX)
C     Check for lost data
          IF (IFLAG .EQ. 0) GO TO 1110
            CALL MOVBM(0,0)
            CALL CHARS('LOST',2,3)
```

```
C     Count number of samples
1110      NSAMPS = NSAMPS + 1
          IF (IARRAY(1) .GT. IPCUT)  GO TO 1150
          NZEROS = NZEROS + 1
C     Pressure is zero -- see if it has just gone zero
          IF (NZEROS .GT. 300)  GO TO 1130
          IF (NZEROS .GT.   1)  GO TO 1100
C     Pressure just turned zero -- tally as pen up
          IF (NUP .LT. 20)  NUP = NUP + 1
          IPENUP(NUP) = NSAMPS
C     Also set next two points to the zero level
          DO 1120  I=1,2
             NUMPTS = NUMPTS + 1
             DO 1120  K=1,3
                JDATA(NUMPTS,K) = IZEROS(K)
1120      CONTINUE
          GO TO 1100
C     5 sec since activity on pressure, either finished
C         or haven't started
1130      IF (NUMPTS .GT.  0 )  GO TO 2000
          ICH = 1
          IF (NZEROS .GT. 3000)  GO TO 2000
          GO TO 1100
C
C     Pressure is non-zero -- writing in progress
1150      CONTINUE
          IF (NZEROS .EQ. 0)  GO TO 1170
C     Writing just started -- also save two zero values
          DO 1160  I=1,2
             NUMPTS = NUMPTS + 1
             DO 1160  K=1,3
                JDATA(NUMPTS,K) = IZEROS(K)
1160      CONTINUE
          IF (NUP .LT. 20)  NUP = NUP + 1
          IPENUP(NUP) = NSAMPS
          NZEROS = 0
C     Save the sample
1170      NUMPTS = NUMPTS + 1
          DO 1180  K=1,3
             JDATA(NUMPTS,K) = IARRAY(K)
1180      CONTINUE
          IF (NUMPTS .LT. MAXPTS-5)  GO TO 1100
C
C     Too many points -- give message
          CALL MOVBM(-2040,-1000)
          CALL CHARS(CTO12,8,3)
C--------------------------------------------------------------------
C     Signature has ended
2000      CALL PENOFF
C     Check for abort key
          IF (ICH.EQ.'A' .OR. ICH.EQ.'a')  GO TO 100
          CALL MOVBM(-1000, -500)
          CALL CHARS(CTO11,10,3)
          IF (ICH .NE. 0)  GO TO 9200
C     Compute statistics before massaging data
          CALL STATS(BEFORE,JDATA,NUMPTS,3,MAXPTS)
          CALL MOVERL(BEFORE,STAT,12)
C     On option, print data
          IF (NPRINT .GT. 98)  PRINT 21,NUMPTS
     +           ,(I,(JDATA(I,J),J=1,3),I=1,NUMPTS)
C     Standardize to the same length records
          CALL NORMAL(JDATA,NUMPTS,IDATA,256,3,MAXPTS)
          IF (NPRINT.GT.49) PRINT 22,(I,(IDATA(I,J),J=1,3),I=1,256)
C     Normalize to mean(BIASES), standard deviation (SCALES)
          DO 2030  K=1,3
             S   =  SCALES(K)/STAT(K,2)
             OLD =  STAT(K,1)
             DO 2020  I=1,256
                IDATA(I,K) = (IDATA(I,K) - OLD)*S + BIASES(K)
2020         CONTINUE
2030      CONTINUE
          IF (NPRINT.GT.0) PRINT 24,(I,(IDATA(I,J),J=1,3),I=1,256)
C     Compute statistics after normalizing data to 256 points,
C         mean 0, standard deviation 1000
          CALL STATS(AFTER,IDATA,256,3,256)
```

```
          CALL MOVERL(AFTER(1,3),STAT(1,3),6)
C
C     Print statistics
          NTOTIM  =  IPENUP(NUP) - IPENUP(1)
          TSEC    =  FLOAT(NTOTIM)/FLOAT(IRATES(IRATE))
          PRINT 3
          PRINT 4, SIGNAT,AUTHOR,NEXTDR,NTOTIM,TSEC,NUMPTS,IZEROS
     +             ,NDATE,NTIME,(IPENUP(I),I=1,NUP)
C     Total pen up time (samples then seconds)
          NTOTDN = 0
          DO 2110  I=1,NUP,2
            NTOTDN  =  NTOTDN + (IPENUP(I+1)-IPENUP(I))
2110      CONTINUE
          TOTDN   =  FLOAT(NTOTDN) / FLOAT(IRATES(IRATE))
C     total pen down time (samples then seconds)
          J       =  NUP - 1
          NTOTUP  =  0
          DO 2120  I=2,J,2
            NTOTUP  =  NTOTUP + (IPENUP(I+1)-IPENUP(I))
2120      CONTINUE
          TOTUP   =  FLOAT(NTOTUP) / FLOAT(IRATES(IRATE))
          I       =  NUP/2 - 1
          J       =  NUP/2
          PRINT 31, I,NTOTUP,TOTUP,J,NTOTDN,TOTDN
          PRINT 32
          DO 2200 J = 1,12
            PRINT 33,STATID(1,J),STATID(2,J),(BEFORE(K,J),K=1,3)
     +              ,(AFTER(K,J),K=1,3)
2200      CONTINUE
C
C     Write output record
          ENCODE (4,6,IRECID)  NEXTDR
          IF (NEXTDR .GT. NUMDAT)  NUMDAT = NEXTDR
          WRITE (1'NEXTDR)  SIGNAT,AUTHOR,NDATE,NTIME,NSRATE
     +             ,NTOTIM,NUP,IPLPEN,RECID,STAT,IPENUP,IDATA
          WRITE (1'MAXREC)  NUMDAT,MAXDAT,LENDAT,NEXTDR
C----------------------------------------------------------------
9000      CONTINUE
          ENDFILE 1
          CALL DPOFF
          CALL RUN('DK1:SIG11')
          STOP
      END C SAMPLE.FTN
      SUBROUTINE NORMAL(IX,N,IY,M,K,MM)
C        AUGUST 27, 1974
C Normalize the data contained in IX (with N samples on each of K
C   channels to IY with M samples per channel, using linear
C   interpolation where necessary.
C This version for the PDP-11
C
      DIMENSION IX(MM,1),IY(M,1)
C
          R   =  FLOAT(N-1) / FLOAT(M-1)
          M1  =  M - 1
C
          DO 20  J=2,M1
            X    =  (J-1)*R + 1.0
            L    =  X
            LP1  =  L + 1
            Q    =  X - L
            DO 10  I=1,K
              IY(J,I) = (IX(LP1,I)-IX(L,I))*Q + IX(L,I) + 0.5
10          CONTINUE
20        CONTINUE
C
          DO 30  I=1,K
            IY(1,I) =  IX(1,I)
            IY(M,I) =  IX(M,T)
30        CONTINUE
C
C
          RETURN
      END
```

```
C   SAMPLE.FTN
      SUBROUTINE STATS(SS,ID,NPT,NCH,MAX)
C         December 2, 1974
C   Compute statistics (SS) for each channel over the data (ID)
C
C   ID(I,K)  amplitude at time I for channel K
C   SS(K,J)  statistic J for channel K--J=1=Ave, J=2=Sdv, J=3=Max, J=4=Min
C            J=5=Ave Abs, J=6=Ave Pos, J=7=Num Pos, J=8=Ave Neg
C            J=9=Num Neg, J=10=Number of Zero Crossings
C   NPT      number of points for each channel
C   NCH      number of channels
C-----------------------------------------------------------------------
      DIMENSION SS(3,10),ID(MAX,3),ST(10)
      EQUIVALENCE (ST(1),SUM),(ST(2),SSQ),(ST(3),DMAX),(ST(4),DMIN)
     +           ,(ST(5),SABS),(ST(6),SPOS),(ST(7),NPOS),(ST(8),SNEG)
     +           ,(ST(9),NNEG),(ST(10),NO)
C-----------------------------------------------------------------------
C
C   Compute statistics for each channel
C
      DO 50 K=1,NCH
C
C   Initilize sums
C
      DO 10 J=1,10
          ST(J) = 0.0
10    CONTINUE
      A    = ID(1,K)
      DMAX = A
      DMIN = A
      NO   = 0
      NPOS = 0
      NNEG = 0
C
C   Calculate sums
C
      DO 20 I =1,NPT
          D    = ID(I,K)
          SUM  = SUM + D
          SSQ  = SSQ + D*D
          SABS = SABS + ABS(D)
          IF (D .GT. DMAX)  DMAX = D
          IF (D .LT. DMIN)  DMIN = D
          IF (A*D .LT. 0.0) NO = NO + 1
          IF (D .GT. 0.0)   NPOS = NPOS + 1
          IF (D .GT. 0.0)   SPOS = SPOS + D
          IF (D .LT. 0.0)   NNEG = NNEG + 1
          IF (D .LT. 0.0)   SNEG = SNEG + D
          A = D
20    CONTINUE
C
C   Calculate averages
C
      SS(K,1) = SUM/NPT
      SS(K,2) = SQRT((SSQ-NPT*SS(K,1)**2)/(NPT-1))
      SS(K,3) = DMAX
      SS(K,4) = MIN
      SS(K,5) = SABS/NPT
      SS(K,7) = NPOS
      SS(K,9) = NNEG
      SS(K,10) = NO
      IF (NPOS .GT. 0)  SS(K,6) = SPOS/NPOS
      IF (NNEG .GT. 0)  SS(K,8) = SNEG/NNEG
C
50    CONTINUE
C-----------------------------------------------------------------------
      RETURN
      END
      SUBROUTINE DYNAM (IAREA,IDATA,STAT)
C   Copyright 1975, Stanford Research Institute
C         SEPTEMBER 16, 1974
C   Draw a facsimile (dynamic plot) of the original signature by
C   plotting integrated X verses integrated Y
```

```
C
C    *BEWARE*  this subroutine smashes blank COMMON
C
C    IDATA(I,J) amplitude at time I for chan J -- subtract BIASES(J) and
C               divide by SCALES(J) to get MEAN(0) SDV(1).
C    STAT(I,J)  statistic J for channel I for scaled data
C               J=1=AVE, J=2=SDV, J=3=MAXIMUM, J=4=MINIMUM
C    IAREA=1 for left plot area, IAREA=2 for right plot area
C---------------------------------------------------------------
      DIMENSION IDATA(256,3),STAT(3,4)
      LOGICAL DEBUG
      COMMON /DEBUG/   DEBUG,NPRINT
      COMMON /LUNS/    KB,LP,LD,LT
      COMMON /TRAN/    SCALES(3),BIASES(3)
      COMMON /PLOCS/   IHBEG(2),IVBEG,IHINC,IVINC
C   Parameters for facsimile plot of signature
      COMMON /SIGPAR/  XINC,XUPINC,INTMAX,INTMIN
     +                ,APARAM,BPARAM,CPARAM
C***BEWARE*** this COMMON is smashed by this subroutine
      COMMON  XX(256),YY(256),INT(256),IPENUP(20)
     +       ,XMIN,XMAX,YMIN,YMAX,YSUM, PMAX,PMIN, P,X,Y
C---------------------------------------------------------------
      DEBUG = (NPRINT.GT.4).AND.(NPRINT.LT.51)
      IF (NPRINT .EQ. 99) DEBUG = .TRUE.
C   Initialize statistics on the integrated values
      XMIN   = 0.0
      XMAX   = 0.0
      YMIN   = 0.0
      YMAX   = 0.0
      YSUM   = 0.0
      PMIN   = STAT(1,4)
      PMAX   = STAT(1,3)
      XX(1)  = 0.0
      YY(1)  = 0.0
      N      = 1
      NUP    = 0
      NB     = 2
      P0     = STAT(1,4) + 0.5*SCALES(1)
C   Scale pressure between intensity levels INTMIN and INTMAX
      SP     = (INTMAX-INTMIN) / (PMAX-PMIN)
C---------------------------------------------------------------
C   Loop on points in each signal
      DO 50 I=1,255
      IF (IDATA(I,1) .LT. P0 ) GO TO 20
      IF (    I      .EQ. 256) GO TO 20
C         P.NE.0 implies pen down, accumulate sums
      N      = N + 1
      P      = (IDATA(I,1) - BIASES(1) - PMIN)/SCALES(1)
      X      = (IDATA(I,2) - BIASES(2))/SCALES(2)
      Y      = (IDATA(I,3) - BIASES(3))/SCALES(3)
      PX     = AMAX1(0.01, APARAM*P+BPARAM)
      PY     = AMAX1(0.01, APARAM*P+CPARAM)
      XX(N)  = XX(N-1) + X/PX + XINC
      YY(N)  = YY(N-1) + Y/PY
      INT(N) = (IDATA(I,1) - PMIN)*SP + INTMIN
      YSUM   = YSUM + YY(N)
      IF (XMAX .LT. XX(N))  XMAX = XX(N)
      IF (XMIN .GT. XX(N))  XMIN = XX(N)
      GO TO 40
C         pressure is zero (pen is up)
   20 IF (N-NB .LE. 1)  GO TO 40
C         center this part of signature about x axis
      YSUM   = YSUM/(N-NB)
      NB     = NB + 1
      DO 30 J=NB,N
         YY(J) = YY(J) - YSUM
         IF (YMAX .LT. YY(J))  YMAX = YY(J)
         IF (YMIN .GT. YY(J))  YMIN = YY(J)
   30 CONTINUE
      NB     = N
      NUP    = MIN0(NUP+1,20)
      IPENUP(NUP) = N
      N      = N + 1
      YY(N)  = 0.0
      YSUM   = 0.0
```

```
              XX(N)  =  XX(N-1) + XUPINC
  40       IF (NPRINT .EQ. 40)  WRITE (LP,41)  I,N,NB,NUP
     +              ,X,Y,P,(IDATA(I,J),J=1,3),XMAX,XMIN,YMAX,YMIN
  41       FORMAT (1X,I3,3I4,3F6.2,1X,3F6.2,1X,4F5.1)
  50     CONTINUE
C
C     Scale to available plot area
           BIAS  =  IVBEG + IVINC*3
           SX    =  FLOAT(256*IHINC) / (XMAX-XMIN)
           IF (YMAX .GT. YMIN)  GO TO 60
              WRITE (LP,55)  YMAX,YMIN,BIAS,SX,XMAX,XMIN,NUP
     +                       ,(IPENUP(I),I=1,NUP)
  55       FORMAT (' ERROR IN DYNAM, YMAX.LE.YMIN',3F6.0,F7.2,2F6.0
     +            ,/,I3,3X,20I3)
              WRITE (LP,56)  N,(XX(I),YY(I),I=1,N)
  56       FORMAT (1X,I5,/,(5(1X,2F5.0)))
           GO TO 90
  60       SY    =  FLOAT(IVINC) / (YMAX-YMIN)
           NB    =  1

DO 80  J=1,NUP
              IH  =  (XX(NB)-XMIN)*SX + IHBEG(IAREA)
              IV  =  (YY(NB)-YMIN)*SY + BIAS
              CALL MOVBM(IH,IV)
              NB  =  NB + 1
              NE  =  IPENUP(J)
              II  =  50
              DO 70  I=NB,NE
                 IH  =  (XX(I) - XMIN)*SX + IHBEG(IAREA)
                 IV  =  (YY(I) - YMIN)*SY + BIAS
                 IF (INT(I) .NE. II)  CALL INTSET(INT(I))
                 II  =  INT(I)
                 CALL IVECT(IH,IV,0)
  70          CONTINUE
              NB  =  IPENUP(J) + 1
  80       CONTINUE
C-------------------------------------------------------------------
  90       CONTINUE
           RETURN
C-------------------------------------------------------------------
           END
```

What is claimed is:

1. The method of processing signature signals to enable display over an area having predetermined horizontal and vertical dimensions comprising
   writing a sample signature on a surface with a pen,
   generating while writing a succession of signals xi representative of forces in the horizontal direction, and a succession of signals yi representative of forces yi in the vertical direction,
   successively integrating said xi signals to form successive Xij signals,
   successively integrating said yi signals to form successive Yij signals,
   scaling said Xij signals in accordance with said horizontal dimension to provide coordinate Xij signals, to fit within said horizontal dimensions,
   scaling said Yij signals in accordance with said vertical dimension to provide coordinate Yij signals which fit within said vertical dimensions, and
   utilizing said Xij and Yij coordinate signals for display.

2. The method as recited in claim 1 wherein said step of scaling said Xij signals includes generating a scale factor signal Kx which when combined with successive Xij signals alters them to fit within said display horizontal dimension.

3. The method as recited in claim 2 wherein said step of generating said scale factor signal Kx comprises
   comparing said successive Xij signals with one another to obtain a maximum Xij signal and a minimum Xij signal,
   subtracting said minimum Xij signal from said maximum Xij signal to produce an Xij difference signal,
   generating an $X_{plot}$ signal representing said display horizontal dimension, and
   combining said Xij difference signal and said $X_{plot}$ signal to produce a horizontal scale factor signal Kx.

4. The method as recited in claim 1 wherein there is included the step of adding a predetermined signal value to each of said successive xi signals, prior to integration to alter the size of loops in the signature which is being displayed.

5. The method as recited in claim 3 wherein there is included
   establishing a signal ΔP representing a predetermined horizontal spacing between each pen lift from said surface and each subsequent application of the pen to said surface for writing, (pen down),
   successively adding the number of ΔP signals generated between each pen lift and pen down to produce successive SΔP signals, subtracting said minimum Xij signal from each successive Xij signal formed by integrating successive xi signals to produce Xij−Xmin signals, combining said successive Xij signals with said scale factor to produce Xij coordinate signals including multiplying said Xij−Xmin signals by said scale factor to produce successive coordinate Xij signals, and adding to each of the successively produced coordinate Xij signals which are produced in the interval between a pen down and the following pen lift, the SΔP signal produced just prior to the pen down, to produce resultant Xij coordinate signals.

6. The method as recited in claim 5 wherein there is included establishing a signal ΔT representative of a predetermined horizontal spacing desired from one side of said display area, and adding said ΔT signal to each of said resultant Xij coordinate signals to produce Xij" signals.

7. The method as recited in claim 1, wherein there is included generating, for each of said xi and yi signals a Pi signal representative of the pressure with which said pen is applied to said writing surface, and utilizing each said Pi signal to modulate the intensity with which each said Xij, Yij coordinate signal is displayed.

8. The method as recited in claim 1, wherein said step of scaling said Yij signals includes generating a scale factor signal Ky, which when combined with successive Xij signals alters them to fit without the vertical dimension of said display area.

9. The method of processing signatures as recited in claim 8, wherein said step of generating said scale factor Ky comprises counting the number of yi signals generated over the intervals between successive applications of said pen to said writing surface, (pen downs) and immediately following pen ups, each said interval being defined as a sector, to produce a total count signal Nj for each sector, integrating said successively integrated Yij signals for each sector to produce successive integrated Yij signals for each sector, dividing each successive integrated Yij signal for each sector by the total count signal Nj for that sector to produce an average value signal $\overline{Y}j$ for each sector, comparing the successive Yij signals produced within each sector with one another to produce, for each sector, a maximum Yij signal, and a minimum Yij signal, for each sector subtracting said $\overline{Y}j$ signal from said maximum Yij signal to produce a first difference signal, for each sector, for each sector subtracting said minimum Yij signal from said $\overline{Y}j$ signal to produce a second difference signal, for each sector, comparing said first and second difference signals to produce for each sector a Y'max signal representing the larger of the two, comparing each successive Y'max signal for each sector with the largest Y'max obtained from previous sectors to obtain a Ybigger signal representative of the largest Y'max signal for all sectors, generating a $Y_{plot}$ signal representative of the vertical dimension of said display area, and combining said $Y_{plot}$ signal and said Y bigger signal to produce a Ky scale factor signal.

10. The method as recited in claim 9 wherein said step of scaling said Yij signals in accordance with said vertical dimension to provide coordinate Yij signals further includes, subtracting each $\overline{Y}j$ signal for a sector from the Yij signals for that sector to produce Yij' signals, and multiplying said Yij' signals by said Ky signal to produce said scaled Yij coordinate signals.

11. The method as recited in claim 1 comprising writing a specimen signature with said pen, generating while writing said specimen signature a succession of xi signals and yi signals respectively representative of forces in the horizontal direction and vertical direction, successively integrating said specimen signature xi signals to form successive specimen signature Xij signals, successively integrating said specimen signature yi signals to form successive specimen signature Yij signals, scaling said respective specimen signature Xij and Yij signals in accordance with said display area respective horizontal and vertical dimensions to provide respective specimen signature Xij and Yij coordinate signals which fit within said display area dimensions, and displaying said Xij and Yij coordinate signals for said sample signature and said specimen signature Xij and Yij coordinate signals to afford comparison.

12. The method of processing a signature to enable display over an area having predetermined horizontal and vertical dimensions comprising writing a sample signature with a pen, generating while writing a succession of signals xi, yi respectively representative of simultaneous forces in the horizontal direction and in the vertical direction, successively integrating said xi signals to form successive Xij signals, successively integrating said yi signals to form successive Yij signals, generating a pen up signal, Pu, each time said pen is lifted and writing is discontinued, generating a pen down signal, Pd, each time said pen is applied to a surface for writing, the interval between a Pd signal and a succeeding Pu signal being called a sector, selecting a maximum and a minimum Xij signal from said successive Xij signals, generating a signal Xplot representing the display horizontal dimension, combining said Xplot signal and said selected maximum and minimum Xij signals to form a scale factor Kx representative of the amount all Xij signals must be altered so that maximum Xij falls within the display area, successively multiplying each Xij signal by said Kx signal to form successive Xij" scaled coordinate signals, counting the number of yi signals generated during each sector, and establishing a signal Nj representing the total count for each said sector interval, integrating the Yij signals for each sector to obtain for each sector a doubly integrated Yij signal, dividing each doubly integrated Yij signal for a sector by the Nj signal for that sector to obtain an average value signal $\overline{Y}j$ for each sector, selecting from the succession of Yij signals generated over each sector and maximum and minimum Yij signals, generating a signal Y plot representing the display vertical dimension, combining said Y plot signal, said Yij signals generated for each sector, said $\overline{Y}i$ signals for the corresponding sectors and said Yij maximum and Yij minimum signals to produce a scale factor signal Ky, representative of the amount all Yij signals must be altered so that maximum and minimum Yij signals fall within said vertical dimensions, successively combining each Xij signal with scale factor Kx signal to obtain successive scaled coordinate signals Xij", successively subtracting each $\overline{Y}i$ signal from each of the associated Yij signals to produce successive Yij difference signals, and successively combining said Yij difference signals with Ky to produce scaled coordinate signals Yij", whereby said Xij" and Yij" scaled coordinate signals may be displayed.

13. A system for processing signals representing horizontal force signals x and vertical force signals y, which are generated by a pen means used for writing a signature, so that they can be displayed over an area having predetermined vertical and horizontal dimensions, comprising means for sampling said x and y force signals to produce successive sample signals xi and yi therefrom, means for successively integrating said xi and yi signals to produce successive Xij and Yij signals therefrom, means for scaling said successive Xij signals in accordance with said horizontal dimension to provide successive coordinate Xij signals which fit within said display area horizontal dimension, and means for scaling said successive Yij signals in accordance with said vertical dimension to provide successive coordinate Yij signals which fit within said display area vertical dimension.

14. A system as recited in claim 13 wherein said means for scaling said successive Xij signals includes means for generating a scale factor signal Kx which when combined with said successive Xij signals alters them to fit within said display horizontal dimension.

15. A system as recited in claim 14 wherein said means for generating a scale factor signal Kx includes means for comparing said successive Xij signals with each other to obtain a maximum Xij signal and a minimum Xij signal, means for subtracting said minimum Xij signal from said maximum Xij signal to produce an Xij difference signal, means for generating an $X_{plot}$ signal which represents said display horizontal display dimension, and means for combining said Xij difference signal and said Xplot signal to produce a horizontal scale factor signal Kx.

16. A system as recited in claim 15 wherein there is included means for establishing a signal $\Delta P$ representing a predetermined horizontal spacing between each pen lift from said surface and each time said pen is applied to said surface for writing, (pen down), means for successively adding the number of $\Delta P$ signals generated between each pen lift and pen down to produce successive $S\Delta P$ signals, means for subtracting said minimum Xij signal from each successive Xij formed by integrating successive Xi signals to produce Xij−X min signals, said means for combining said successive Xij signals with said scale factor to produce Xij coordinate signals comprises means for multiplying said Xij−Xmin signals by said scale factor to produce successive coordinate Xij signals, and means for adding to each of the successively produced coordinate Xij signals which are produced, in the interval between a pen down following a pen lift, the $S\Delta P$ signal produced just prior to the pen down, to produce resultant Xij coordinate signals.

17. The system recited in claim 16 wherein there is included means for establishing a signal $\Delta T$ representative of a predetermined horizontal spacing desired from one side of said display area, and means for adding said $\Delta T$ signal to each of said resultant Xij coordinate signals to produce $X_{ij}''$ signals, 18. The system as recited in claim 13 wherein said pen means includes means for generating for each of said xi and yi signals, a Pi signal representative of the pressure with which said pen is applied to said writing surface, and means for utilizing each said Pi signal to modulate the intensity with which each said Xij and Yij coordinate signals are displayed.

19. A system as recited in claim 13 wherein said step of scaling said Yij signals includes means for generating a scale factor signal Ky, which when combined with successive Xij signals alters them to fit within said display horizontal dimension.

20. The system for processing signatures as recited in claim 19, wherein said step of generating said scale factor Ky comprises means for counting the number of yi signals generated over the intervals between successive applications of said pen to said writing surface, (pen downs) and immediately following pen ups, each said interval being defined as a sector, to produce a total count signal Nj for each sector, means for integrating said successively integrated Yij signals for each sector to produce successive integrated Yij signals for each sector, means for dividing each successive integrated Yij signal for each sector by the total count signal Nj for that sector to produce an average value signal $\overline{Y}j$ for each sector, means for comparing the successive Yij signals produced within each sector with one another to produce for each sector, a maximum Yij signal, and a minimum Yij signal, for each sector, means for subtracting said $\overline{Y}j$ signal from said maximum Yij signal to produce a first difference signal, for each sector, for each sector, means for subtracting said minimum Yij signal from said $\overline{Y}j$ signal to produce a second difference signal, for each sector, means for comparing said first and second difference signals to produce for each sector a Y' max signal representing the larger of the two, means for comparing the Y'max signal for each sector with the Y'max from all preceding sectors to provide a Ybigger signal representative of the largest of these signals for all sectors, means for generating a Yplot signal representative of the vertical dimension of said display area, and means for combining said Yplot signal and said Ybigger signal to produce a Ky scale factor signal.

21. The system as recited in claim 20 wherein said means for scaling said Yij signals in accordance with said vertical dimension to provide coordinate Yij signals further includes, means for subtracting said Yj signal for a sector from the Yij signals for that sector to produce Yij signal, and means for multiplying said Yj' signals by said Ky signal to produce said scaled Yij coordinate signals.

22. The system as recited in claim 13 wherein said pen means is used to write a specimen signature and the x and y force signals generated by said pen means are processed to provide specimen Xij and Yij coordinate signals, means for displaying said Xij and Yij coordinate signals derived from said sample signature and said specimen Xij, Yij coordinate signals to afford a comparison of the displays.

23. Apparatus for processing a signature to enable display over an area having predetermined horizontal and vertical dimensions comprising pen means for generating while said signature is being written a succession of signals xi, yi respectively representative of simulataneous forces in the horizontal direction and in the vertical direction, means for successively integrating said xi signals to form successive Xij signals, means for successively integrating said yi signals to form successive Yij signal, means for generating a pen up signal, Pu, each time said pen is lifted and writing is discontinued, means for generating a pen down signal, Pd, each time said pen is applied to a surface for writing, the interval between a Pd signal and a succeeeding Pu signal being callled a sector, means for selecting a maximum and a minimum Xij signal from said successive Xij signals, means for generating a signal X plot representing the display horizontal dimension, means for combining said $X_{plot}$ signal and said selected maximum and minimum Xij signal to form a scale factor signal Kx representative of the amount all Xij signals must be altered so that maximum Xij falls within the display area, means for successively multiplying each Xij signal by said Kx signal to form successive Xij" scaled coordinate signals, means for counting the number of yi signals generated during each sector, and establishing a signal Nj representing the total count for each said sector interval, means for integrating the Yij signals for each sector to obtain for each sector a doubly integrated Yij signal, means for dividing each doubly integrated Yij signal for a sector by the Nj signal for that sector to obtain an average value signal $\overline{Y}j$ for each sector, means for selecting from the succession of Yij signals generated over each sector the maximum and minimum Yij signals, means for generating a signal Yplot representing the display vertical dimension, means for combining said Yplot signal, said Yij signals generated for each sector, said yi signal for the corresponding sectors and said Yij maximum and Yij minimum signals to produce a scale factor signal Ky, representative of the amount all Yij signals must be altered so that maximum and minimum Yij signals fall within said vertical dimensions, means for successively combining said Xij signal with scale factor Kx signal to obtain successive scaled coordinate signals Xij", means for successively subtracting each Yi signal from each of the associated Yij signals to produce successive Yij difference signal, and means for successively combining said Yij difference signals with Ky to produce scaled coordinate signal Yij", whereby said Xij" and Yij" scaled coordinate signals may be displayed.

24. The method of processing signature signals to enable display over an area having predetermined horizontal and vertical dimensions comprising writing a sample signature on a surface with a pen, generating while writing a succession of signals xi representative of forces in the horizontal direction, and a succession of signals yi representative of forces yi in the vertical direction, successively integrating said xi signals to form successive Xij signals, successively integrating said yi signals to form successive Yij signals, scaling said Xij signals in accordance with said horizontal dimension to provide coordinate Xij signals, to fit within said horizontal dimensions, scaling said Yij signals in accordance with said vertical dimension to provide coordinate Yij signals which fit within said vertical dimensions, recording said Xij and Yij coordinate signals on a card, writing a specimen signature on said surface with said pen, generating while writing said specimen signature a succession of specimen signals xi representative of forces in the horizontal direction, and a succession of signals yi representative of forces in the vertical direction, successively integrating said xi signals to form successive specimen Xij signals, successively integrating said yi signals to form successive specimen Yij signals, scaling said successive specimen Xij signals in accordance with said horizontal dimension to provide coordinate Xij signals, to fit within said horizontal dimensions, scaling said successive specimen Xij signals in accordance with said vertical dimension to provide coordinate Yij signals which fit within said vertical dimensions, reading said Xij and Yij coordinate signals from said card, displaying the signals read from said card, and displaying the scaled specimen Xij and Yij coordinate signals to afford a comparison therebetween.

25. The method of processing signature signals to enable display over an area having predetermined horizontal and vertical dimensions comprising writing a sample signature on a surface with a pen, generating while writing a succession of signals xi representative of forces in the horizontal direction, and a succession of signals yi representative of forces yi in the vertical direction, successively integrating said xi signals to form successive Xij signals, successively integrating said yi signals to form successive Yij signals, scaling said Xij signals in accordance with said horizontal dimension to provide coordinate Xij signals, to fit within said horizontal dimensions, scaling said Xij signals in accordance with said horizontal dimension to provide coordinate Xij signals, to fit within said horizontal dimensions, displaying said coordinate Xij and Yij signals as coordinates to create a simulation of said sample signature, recording said simulation of a sample signature on a card, writing a specimen signature on a surface with said pen, generating while writing a succession of specimen signature signals xi and a succession of signals yi representative respectively of forces in the horizontal and vertical directions, successively integrating said specimen signature xi and yi signals to respectively obtain successive specimen signature Xij and Yij coordinate signals, scaling said specimen signature Xij and Yij coordinate signals in accordance with said respective horizontal and vertical dimensions to fit within said dimensions, and displaying said specimen signature coordinate signals to afford comparison with the sample signature on said card.

* * * * *